(12) United States Patent
Kawai

(10) Patent No.: US 11,271,250 B2
(45) Date of Patent: Mar. 8, 2022

(54) LITHIUM ION SECONDARY BATTERY

(71) Applicant: Murata Manufacturing Co., Ltd., Nagaokakyo (JP)

(72) Inventor: Toru Kawai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 263 days.

(21) Appl. No.: 16/743,474

(22) Filed: Jan. 15, 2020

(65) Prior Publication Data

US 2020/0153047 A1 May 14, 2020

Related U.S. Application Data

(63) Continuation of application No. PCT/JP2018/027154, filed on Jul. 19, 2018.

(30) Foreign Application Priority Data

Jul. 25, 2017 (JP) .............................. JP2017-143514
Aug. 23, 2017 (JP) .............................. JP2017-160528

(51) Int. Cl.
| | |
|---|---|
| H01M 10/0583 | (2010.01) |
| H01M 4/131 | (2010.01) |
| H01M 10/0525 | (2010.01) |
| H01M 4/02 | (2006.01) |

(52) U.S. Cl.
CPC ....... *H01M 10/0583* (2013.01); *H01M 4/131* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 9,711,791 B2 | 7/2017 | Yamamoto et al. | |
| 10,283,769 B2 | 5/2019 | Yamamoto et al. | |

(Continued)

FOREIGN PATENT DOCUMENTS

| | | |
|---|---|---|
| JP | 2006236994 A | 9/2006 |
| JP | 2008053206 A | 3/2008 |

(Continued)

OTHER PUBLICATIONS

International Search Report issued for PCT/JP2018/027153, dated Oct. 23, 2018.

(Continued)

*Primary Examiner* — Wyatt P McConnell
(74) *Attorney, Agent, or Firm* — Arent Fox LLP

(57) ABSTRACT

A lithium ion secondary battery that includes a winding-type electrode assembly in which a positive electrode having a positive electrode active material layer, a negative electrode having a negative electrode active material layer, and a separator interposed therebetween are wound into a roll shape and have a charge cutoff voltage of 4.41 V to 4.47 V. In this lithium ion secondary battery, an area ratio of the entirety of the negative electrode active material layer to an area of a facing portion between the positive electrode active material layer and the negative electrode active material layer is 100.5% to 104.0%. A gap between the positive electrode and the negative electrode is 0.1 mm to 0.5 mm in an axial direction of the winding. A discharge capacity per unit weight of a positive electrode active material in the positive electrode active material layer is 169.0 mAh/g to 178.0 mAh/g.

20 Claims, 4 Drawing Sheets

(56) References Cited

U.S. PATENT DOCUMENTS

| | | |
|---|---|---|
| 2006/0068293 A1 | 3/2006 | Kim et al. |
| 2006/0172185 A1 | 8/2006 | Mimura |
| 2013/0280594 A1* | 10/2013 | Kajita .................. H01M 4/134 |
| | | 429/163 |
| 2015/0104699 A1 | 4/2015 | Nakagawa |
| 2015/0155555 A1 | 6/2015 | Yamamoto et al. |
| 2017/0110724 A1 | 4/2017 | Sakamoto et al. |
| 2017/0279119 A1 | 9/2017 | Yamamoto et al. |
| 2018/0034053 A1 | 2/2018 | Takaoka et al. |

FOREIGN PATENT DOCUMENTS

| | | |
|---|---|---|
| JP | 2012023052 A | 2/2012 |
| JP | 201493271 A | 5/2014 |
| JP | 2015056241 A | 3/2015 |
| JP | 201576389 A | 4/2015 |
| JP | 2015072805 A | 4/2015 |
| WO | 2014021014 A1 | 2/2014 |
| WO | 2015151375 A1 | 10/2015 |
| WO | 2016129527 A1 | 8/2016 |

OTHER PUBLICATIONS

Written Opinion of the International Searching Authority issued for PCT/JP2018/027153, dated Oct. 23, 2018.
International Search Report issued for PCT/JP2018/027154, dated Oct. 23, 2018.
Written Opinion of the International Searching Authority issued for PCT/JP2018/027154, dated Oct. 23, 2018.

* cited by examiner

LITHIUM ION SECONDARY BATTERY

CROSS REFERENCE TO RELATED APPLICATIONS

The present application is a continuation of International application No. PCT/JP2018/027154, filed Jul. 19, 2018, which claims priority to Japanese Patent Application No. 2017-143514, filed Jul. 25, 2017, and Japanese Patent Application No. 2017-160528, filed Aug. 23, 2017, the entire contents of each of which are incorporated herein by reference.

FIELD OF THE INVENTION

The present invention relates to a lithium ion secondary battery.

BACKGROUND OF THE INVENTION

Conventionally, secondary batteries have been used as a power source in various kinds of electronic equipment. The secondary battery has a structure in which a positive electrode, a negative electrode, a separator disposed between the positive electrode and the negative electrode, and an electrolyte are encapsulated in an enclosure. In particular, in a lithium ion secondary battery, lithium ions move between the positive electrode and the negative electrode through the electrolyte to charge and discharge the battery.

In recent years, due to a demand for lithium ion secondary batteries to have high energy density, there has been proposed a lithium ion secondary battery whose charge cutoff voltage is set high (for example, see Patent Document 1). In addition, techniques using a solvent having good ion conductivity in a nonaqueous electrolyte have been proposed (for example, see Patent Documents 2 and 3).

Patent Document 1: Japanese Patent Application Laid-Open No. 2012-23052
Patent Document 2: Japanese Patent Application Laid-Open No. 2015-72805
Patent Document 3: Japanese Patent Application Laid-Open No. 2015-56241

SUMMARY OF THE INVENTION

The inventors of the present invention have found that in a conventional lithium ion secondary battery, when a charge cutoff voltage is increased to 4.41 V or more, new problems occur in that deterioration of a battery material is promoted by increasing the cutoff voltage, and cycle characteristics are deteriorated. In a lithium ion secondary battery, if the cycle characteristics are deteriorated, a discharge capacity decreases due to repeated charge and discharge, and a ratio of a cell capacity (capacity retention rate) after cycling to an initial cell capacity decreases, so that the life of the battery is shortened.

It is an object of the present invention to provide a lithium ion secondary battery which can obtain better cycle characteristics even when the charge cutoff voltage is increased to 4.41 V or more.

The present invention relates to a winding-type lithium ion secondary battery including a winding-type electrode assembly in which a positive electrode having a positive electrode active material layer, a negative electrode having a negative electrode active material layer, and a separator interposed therebetween are wound into a roll shape and have a charge cutoff voltage of 4.41 V to 4.47 V, an area ratio of an entirety of the negative electrode active material layer to an area of a facing portion between the positive electrode active material layer and the negative electrode active material layer of 100.5% to 104.0%, a gap between the positive electrode and the negative electrode of 0.1 mm to 0.5 mm in an axial direction of the winding, and a discharge capacity per unit weight of a positive electrode active material in the positive electrode active material layer of 169.0 mAh/g to 178.0 mAh/g.

The lithium ion secondary battery of the present invention exhibits better cycle characteristics even when the charge cutoff voltage is increased to 4.41 V or more.

DETAILED DESCRIPTION OF THE INVENTION

[Lithium Ion Secondary Battery]

The present invention provides a lithium ion secondary battery. In the present specification, the term "lithium ion secondary battery" refers to a battery which can be repeatedly charged and discharged by the transfer of electrons accompanying lithium ions. Therefore, the "lithium ion secondary battery" is not excessively limited by its name, and can include, for example, "a lithium ion electric storage device."

The lithium ion secondary battery (hereinafter sometimes simply referred to as the "secondary battery") of the present invention has a charge cutoff voltage of 4.41 V or more, and from the viewpoint of an increase in energy density due to an increase in voltage of the secondary battery, the charge cutoff voltage is preferably 4.43 V or more, more preferably 4.45 V or more. From the viewpoint of a balance between the increase in energy density due to the increase in voltage of the secondary battery and further improvement of cycle characteristics, the charge cutoff voltage is preferably 4.41 V to 4.47 V, more preferably 4.43 V to 4.47 V, further preferably 4.45 V to 4.47 V, most preferably 4.46 V to 4.47 V. The charge cutoff voltage refers to a cutoff voltage during charging determined at the time of designing the secondary battery, and is also called a "charge upper limit voltage" and is one of specifications of the secondary battery.

In the present specification, the cycle characteristics refer to characteristics in which a decrease in discharge capacity is more sufficiently suppressed even by repeated charge and discharge. "After cycling" means "after repeated charge and discharge."

The secondary battery of the present invention includes a positive electrode, a negative electrode, and a separator disposed between the positive electrode and the negative electrode, and usually further includes a nonaqueous electrolyte. The secondary battery of the present invention is usually configured by encapsulating an electrode assembly constituted of the positive electrode, the negative electrode, and the separator, and the nonaqueous electrolyte in an enclosure.

Figure 1:
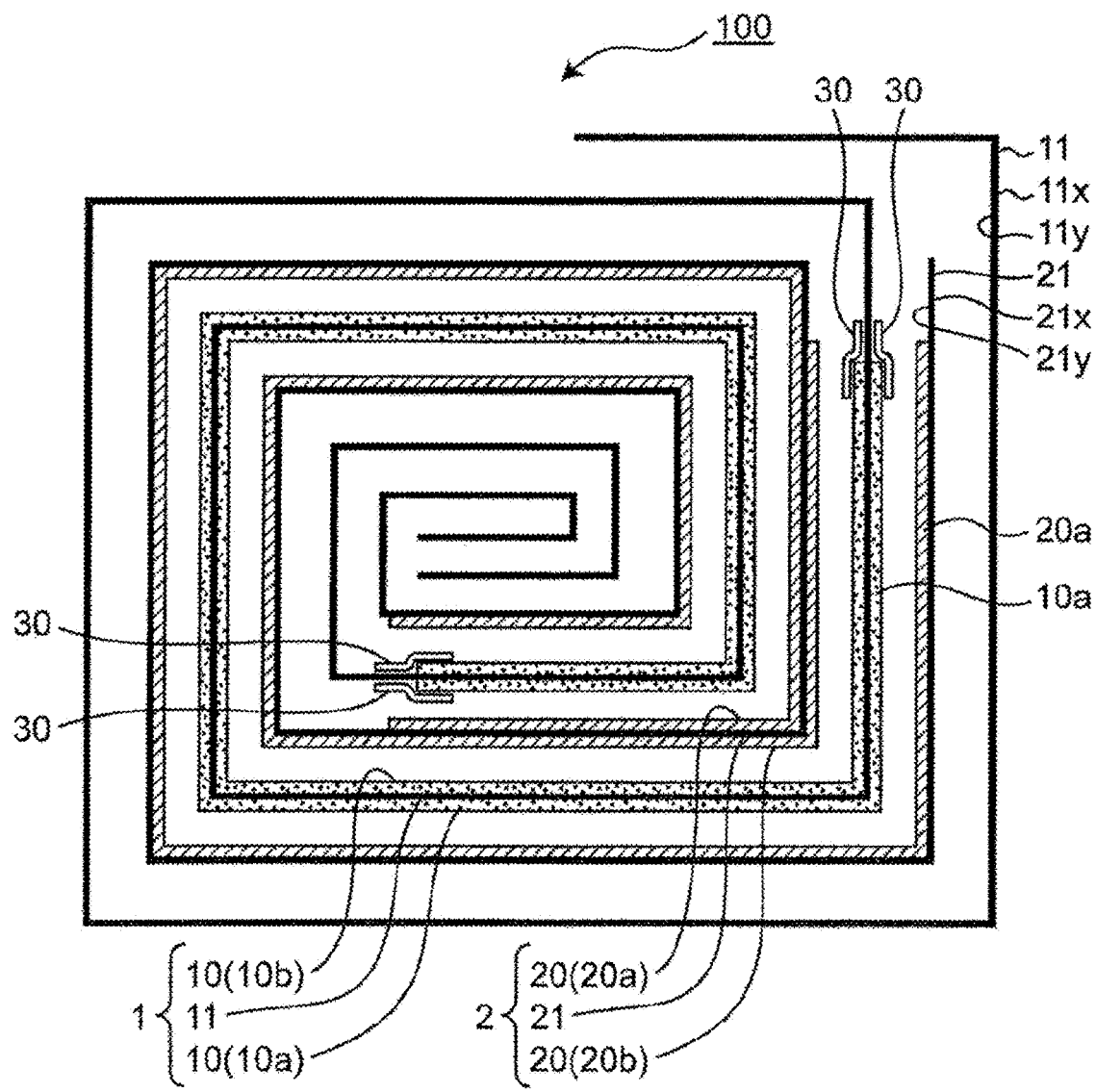
FIG. 1 is a schematic cross-sectional view showing an example of an electrode assembly having a winding structure.

As shown in FIG. 1, an electrode assembly 100 has a winding structure in which a positive electrode 1, a negative electrode 2, and a separator 3 are wound in a roll shape. Specifically, the electrode assembly 100 has a winding structure in which an electrode unit (electrode constituent layer) including the positive electrode 1, the negative electrode 2, and the separator 3 disposed between the positive electrode and the negative electrode is wound in a roll shape. When the electrode assembly has such a winding structure, a lithium ion secondary battery including the electrode assembly is referred to as a "winding type lithium ion secondary battery. The winding structure may also be referred to as a jelly-roll type structure. FIG. 1 is a schematic cross-sectional view showing an example of the electrode assembly having the winding structure. In FIG. 1, the separator 3 is omitted.

Figure 2A:
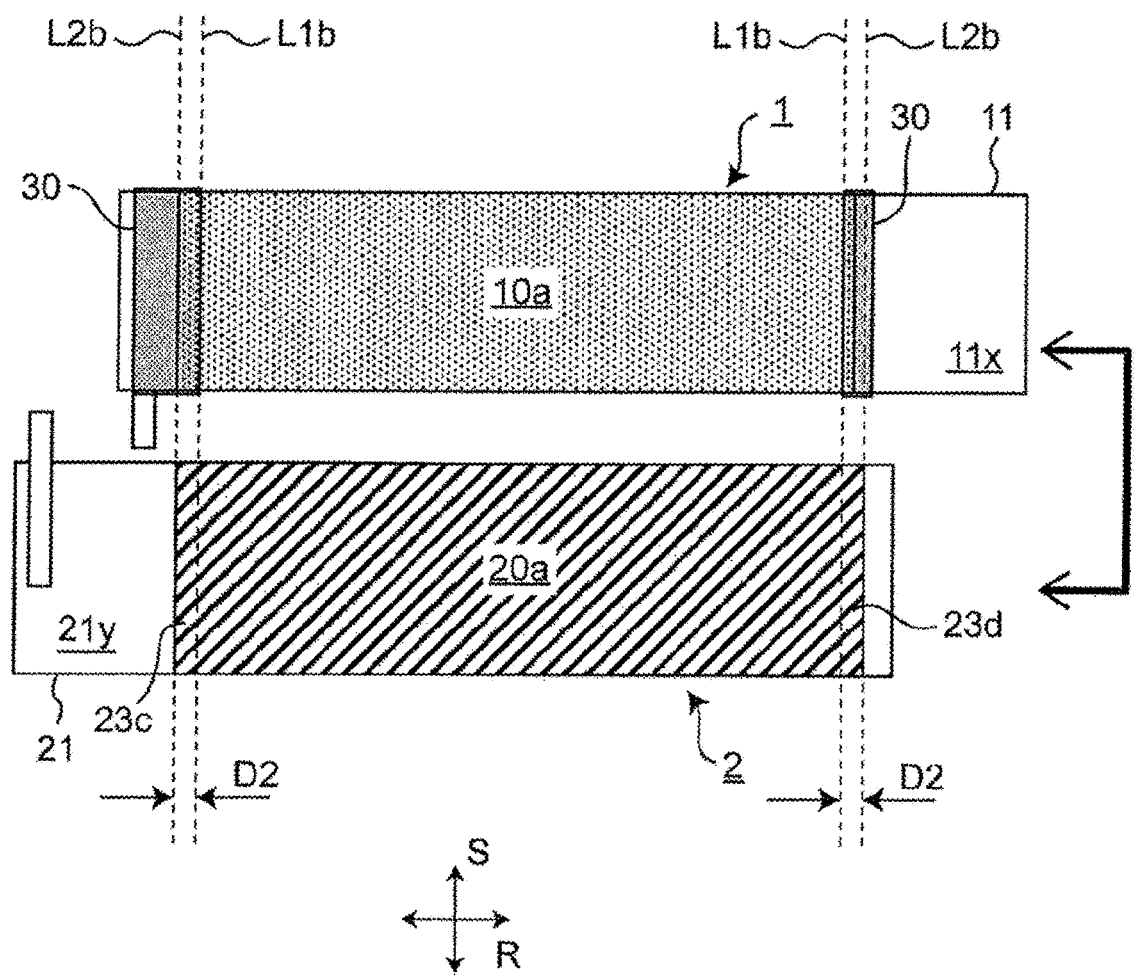
FIG. 2A is an exploded schematic view (schematic development view) of the electrode assembly of FIG. 1 for describing an arrangement and relationship of a pair of a positive electrode active material layer and a negative electrode active material layer facing each other while unwinding the electrode assembly.
Figure 2B:
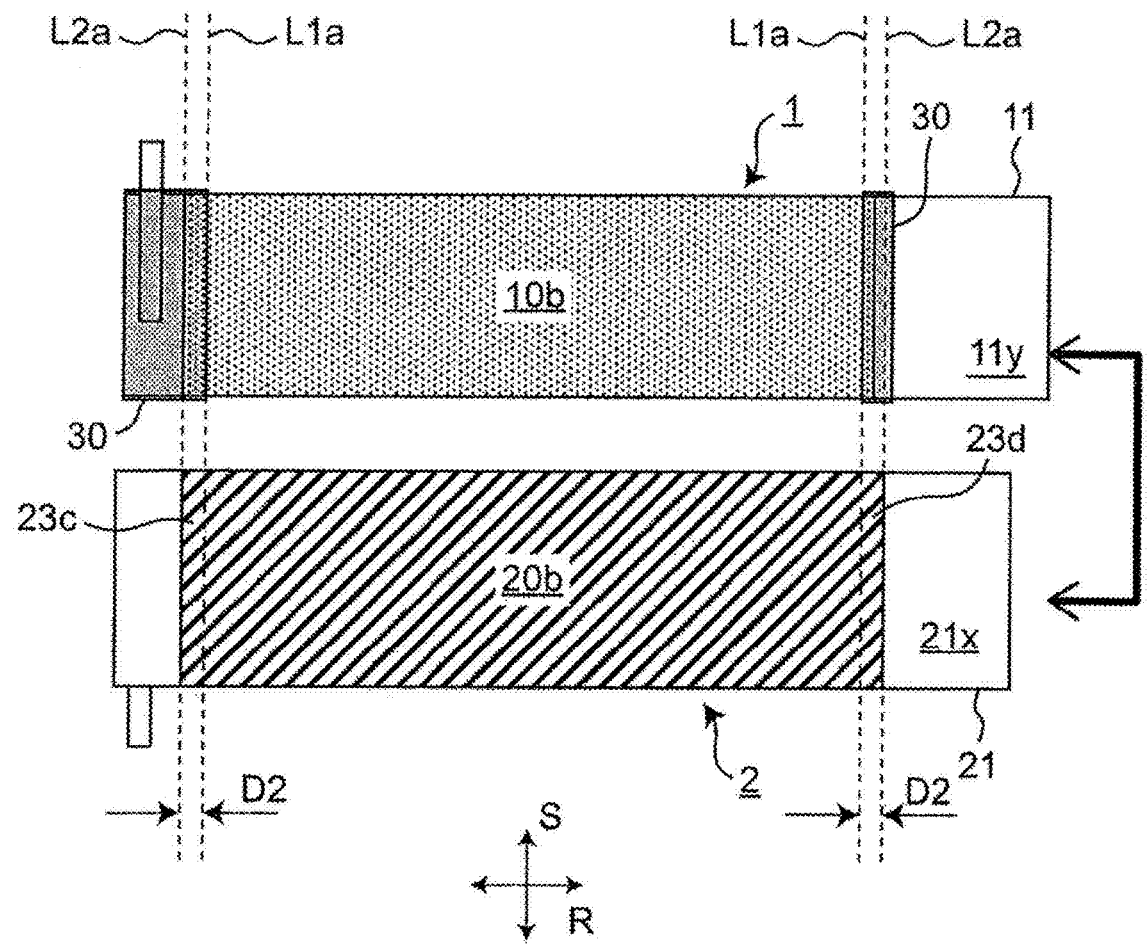
FIG. 2B is an exploded schematic view (schematic development view) of the electrode assembly of FIG. 1 for describing an arrangement and relationship of another pair of a positive electrode active material layer and a negative electrode active material layer facing each other while unwinding the electrode assembly.
Figure 2C:
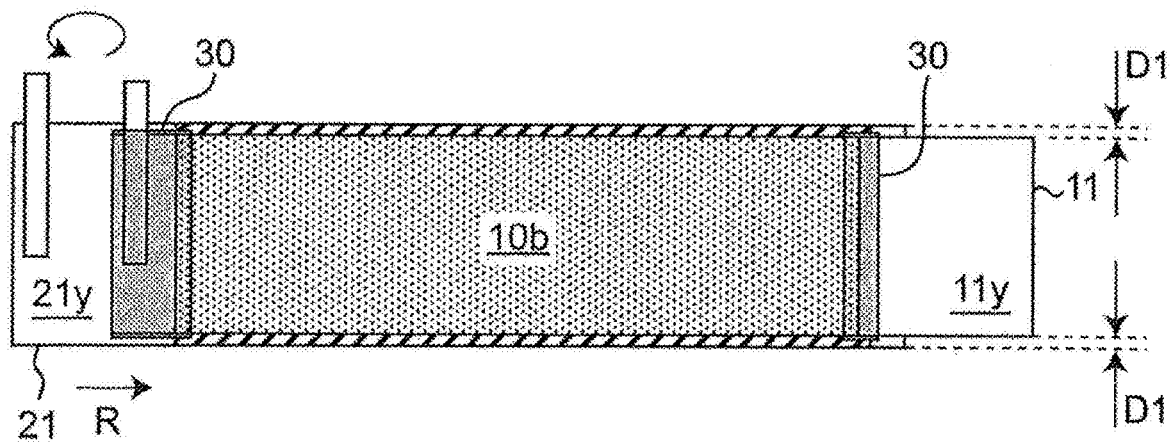
FIG. 2C is an exploded schematic view (schematic development view) of the electrode assembly when a positive electrode is superimposed on a negative electrode in FIG. 2A so that the positive electrode active material layer and the negative electrode active material layer face each other.

The winding structure of the electrode assembly 100 will now be described. FIG. 2A shows an exploded schematic view (schematic development view) of the electrode assembly for describing an arrangement and relationship of a set of a positive electrode active material layer 10a and a negative electrode active material layer 20a facing each other while unwinding the electrode assembly 100. In the wound electrode assembly 100, the positive electrode active material layer 10a and the negative electrode active material layer 20a shown in FIG. 2A are arranged to face each other. FIG. 2B shows an exploded schematic view (schematic development view) of the electrode assembly for describing an arrangement and relationship of another set of a positive electrode active material layer 10b and a negative electrode active material layer 20b facing each other while unwinding the electrode assembly 100. In the wound electrode assembly 100, the positive electrode active material layer 10b and the negative electrode active material layer 20b shown in FIG. 2B are arranged to face each other. FIG. 2C is an exploded schematic view (schematic development view) of the electrode assembly when the positive electrode 1 is superimposed on the negative electrode 2 in FIG. 2A so that the positive electrode active material layer 10a and the negative electrode active material layer 20a face each other. The separator is omitted in FIGS. 2A, 2B, and 2C. In FIGS. 2A, 2B, and 2C, an arrangement reference in a winding direction R of the positive electrode 1 and the negative electrode 2 is common to each other. In the present specification, "unwinding the electrode assembly" means that the electrode assembly is unwound without breaking a relative positional relationship between the positive electrode 1 and the negative electrode (that is, while maintaining a mutual arrangement between the positive electrode 1 and the negative electrode 2).

In FIG. 1, the electrode assembly 100 is configured using only one electrode unit including one positive electrode 1, one negative electrode 2, and two separators 3. However, the electrode assembly 100 may be configured using two or more such electrode units. Hereinafter, a case where the electrode assembly 100 is configured using one electrode unit will be described unless otherwise specified.

In the present invention, for the positive electrode active material layer 10 that the positive electrode 1 has and the negative electrode active material layer 20 that the negative electrode 2 has an area ratio of the entirety of the negative electrode active material layer to an area of a facing portion between the positive electrode active material layer and the negative electrode active material layer of 100.5% to 104.0%, and from the viewpoint of further improving the cycle characteristics, the area ratio is preferably 100.5% to 103.6%, more preferably 100.5% to 103.0%, further preferably 100.5% to 101.0%. Thus, the negative electrode active material layer has a size more suitably larger than the positive electrode active material layer, so that a battery reaction is allowed to occur reversibly and continuously with sufficiently high efficiency even in an environment with a relatively high charge cutoff voltage, so that the cycle characteristics are improved. If the area ratio of the entire negative electrode active material layer is too small, Li is likely to precipitate from an edge portion of the negative electrode active material layer, and the amount of Li ions that move reversibly decreases, resulting in poor cycle characteristics. If the area ratio of the entire negative electrode active material layer is too large, a potential of the edge portion of the positive electrode active material layer rises due to an influence of a non-facing portion of the negative electrode active material layer with the positive electrode active material layer, and the positive electrode active material deteriorates. Therefore, the battery reaction is less likely to occur reversibly, and the cycle characteristics deteriorate. The "edge portion" refers to an electrode cut surface (current collector end surface (surface parallel to a thickness direction of the current collector)) at a portion of the electrode where the active material layer is coated. Specifically, the "edge portion" refers to, for example, a current collector end surface at a portion where an active material layer end surface (surface parallel to a thickness direction of the active material layer) and the current collector end surface are substantially flush (substantially continuous).

The above-described area ratio of the entirety of the negative electrode active material layer to the area of the facing portion between the positive electrode active material layer and the negative electrode active material layer may be achieved between all sets of positive electrode active material layers (for example, 10a) and negative electrode active material layers (for example, 20a) facing each other with a separator interposed therebetween in a wound electrode assembly. That is, the total area ratio of an entirety of the negative electrode active material layer to the total area of the facing portions between all sets of the positive electrode active material layers and the negative electrode active material layers may be within the above range. For example, in FIG. 1, the positive electrode 1 has the positive electrode active material layers 10 (10a and 10b, respectively) on both sides (11x and 11y) of a positive electrode current collector 11, and the negative electrode 2 has negative electrode active material layers 20 (20b and 20a, respectively) on both sides (21x and 21y) of a negative electrode current collector 21. Accordingly, the wound electrode assembly 100 shown in FIG. 1 has two sets of the positive electrode active material layers and the negative electrode active material layers (a set of 10a and 20a and a set of 10b and 20b) facing each other. As described above, when the electrode assembly 100 has two sets of the positive electrode active material layers and the negative electrode active material layers facing each other, the total area ratio of the entirety of the negative electrode active material layer to the total area of the facing portions between two sets of the positive electrode active material layers and the negative electrode active material layers may be within the above range. In FIG. 1, the electrode assembly 100 does not necessarily have two sets of the positive electrode active material layers and the negative electrode active material layers, and may have at least one of the sets of the positive electrode active material layers and the negative electrode active material layers.

In the case where the positive electrode 1 has the electrode active material layers 10a and 10b on both sides of the positive electrode current collector 11, when the formation regions of the positive electrode active material layers 10a and 10b on the front and back sides of the positive electrode current collector 11 are seen in a plan view thereof, as shown in FIG. 1 (or FIGS. 2A and 2B), the formation regions may or may not overlap completely. The plan view refers to a plan view showing an object seen in a thickness direction of the object (stacking direction). When the formation regions of the positive electrode active material layers 10a and 10b do not completely overlap on the front and back sides of the positive electrode current collector 11, the positive electrode current collector 11 has a portion where while the positive electrode active material layer is formed on one side, the positive electrode active material layer is not formed on the other side.

In the case where the negative electrode 2 has the electrode active material layers 20a and 20b on both sides of the negative electrode current collector 21, when the formation regions of the negative electrode active material layers 20a and 20b on the front and back sides of the negative electrode current collector 21 are seen in a plan view thereof, the formation regions may overlap completely, or, as shown in FIG. 1 (or FIGS. 2A and 2B), the formation regions may not overlap completely. When the formation regions of the negative electrode active material layers 20a and 20b do not completely overlap on the front and back sides of the negative electrode current collector 21, as shown in FIG. 1 (or FIGS. 2A and 2B), the negative electrode current collector 21 has a portion where while the negative electrode active material layer is formed on one side, the negative electrode active material layer is not formed on the other side.

For each pair of the positive electrode active material layer and the negative electrode active material layer facing each other, the dimension of the negative electrode active material layer is usually larger than the dimension of the positive electrode active material layer. For example, when the negative electrode active material layer and the positive electrode active material layer each have a rectangular shape in the plan view, both the vertical dimension and the horizontal dimension of the negative electrode active material layer are larger than those of the positive electrode active material layer.

Figure 3:
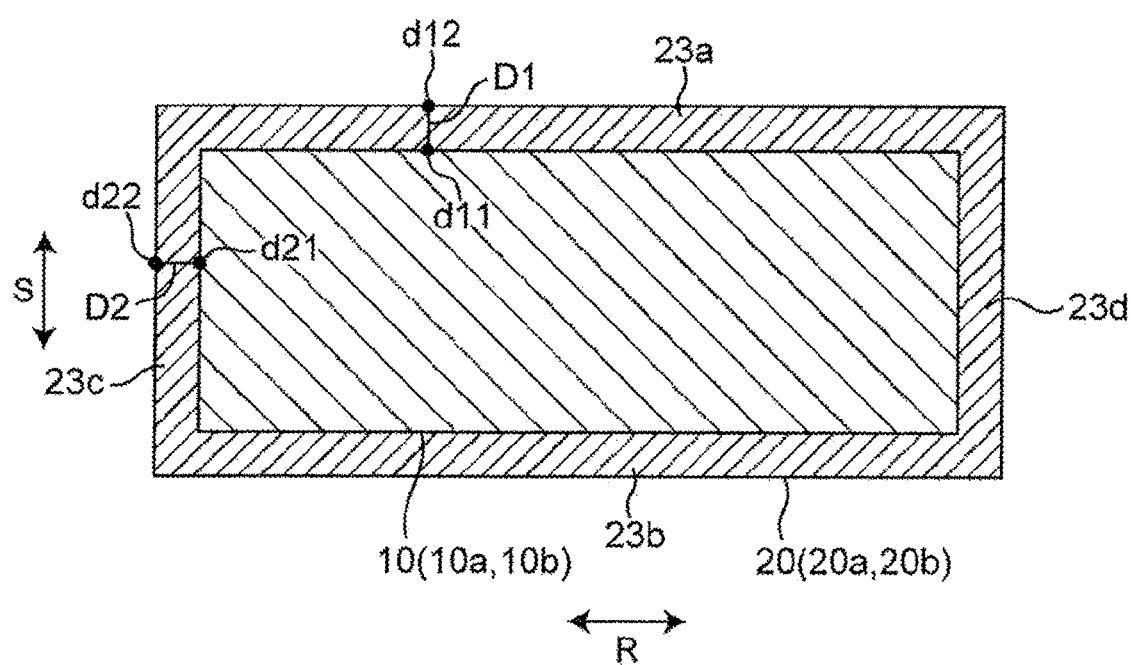
FIG. 3 is a schematic view for describing a gap between the positive electrode and the negative electrode in a lithium ion secondary battery of the present invention.

When the electrode assembly is unwound and only the positive electrode active material layer and the negative electrode active material layer of each set are temporarily taken out as they are and are viewed from the positive electrode active material layer side, as shown in FIG. 3, the negative electrode active material layer 20 can be seen behind the positive electrode active material layer 10. On the other hand, when viewed from the negative electrode active material layer side, the positive electrode active material layer is hidden behind the negative electrode active material layer and thus cannot be seen. FIG. 3 is a schematic plan view of the positive electrode active material layer and the negative electrode active material layer when only one set of the positive electrode active material layer and the negative electrode active material layer facing each other is taken out and unwound in the secondary battery of the present invention.

The area of the facing portion between the positive electrode active material layer and the negative electrode active material layer refers to an area of a region where the positive electrode active material layer 10a (or 10b) and the negative electrode active material layer 20a (or 20b) overlap when each set of these layers facing each other with the separator interposed therebetween is seen in the plan view while unwinding the electrode assembly. As described above, since the dimension of the negative electrode active material layer 20a (or 20b) is larger than the dimension of the positive electrode active material layer 10a (or 10b), the "area of the facing portion between the positive electrode active material layer and the negative electrode active material layer" usually refers to an area occupied by the positive electrode active material layer 10a in the plan view. In the positive electrode 1, as shown in FIGS. 2A, 2B, and 2C, when insulating tapes 30 to be described later are attached to ends of the positive electrode active material layers 10a and 10b in the winding direction R, a region of the positive electrode active material layer where the insulating tape 30 is attached is not regarded as the positive electrode active material layer. That is, the dimension of the positive electrode active material layer is a dimension of a region (coated portion) not masked by the insulating tape 30 in the positive electrode active material layer. In this case, an outer edge of the positive electrode active material layer in the winding direction R corresponds to boundaries L1a and L1b (see FIGS. 2A and 2B) between the coated portion and the insulating tape 30.

The area of the entire negative electrode active material layer refers to an area occupied by the negative electrode active material layer 20a (or 20b) in the plan view when the electrode assembly is unwound. The area ratio of the entirety of the negative electrode active material layer refers to a ratio of the area occupied by the negative electrode active material layer 20a (or 20b) in the plan view to the above-described area of the facing portion between the positive electrode active material layer and the negative electrode active material layer. The outer edges of the negative electrode active material layer 20a and 20b in the winding direction R are usually boundaries L2a and L2b (see FIGS. 2A and 2B) between the coated portion (formation region of the negative electrode active material layer) and a non-coated portion (non-formation region) as shown in FIGS. 2A, 2B, and 2C. In the negative electrode 2, when the insulating tapes 30 to be described later are attached to ends of the negative electrode active material layers 20a and 20b in the winding direction R, a region of the negative electrode active material layer where the insulating tape is attached is not regarded as the negative electrode active material layer. That is, the dimension of the negative electrode active material layer is a dimension of a region (coated portion) not masked by the insulating tape in the negative electrode active material layer.

When the electrode assembly 100 is configured using two or more electrode units, in at least one of the units, the above-described area ratio of the entirety of the negative electrode active material layer to the area of the facing portion between the positive electrode active material layer and the negative electrode active material layer may be achieved. From the viewpoint of further improving the cycle characteristics, it is preferable that the above-described area ratio of the entirety of the negative electrode active material layer to the area of the facing portion between the positive electrode active material layer and the negative electrode active material layer be achieved in all the units. When the positive electrode has positive electrode active material layers on both sides of the positive electrode current collector and the negative electrode has negative electrode active material layers on both sides of the negative electrode current collector, from the same viewpoint, it is more preferable that in not only all units but two adjacent units, the above-described area ratio of the entirety of the negative electrode active material layer to the area of the facing portion between the positive electrode active material layer and the negative electrode active material layer be achieved. That is, it is more preferable that between the positive electrode active material layer in one unit and the negative electrode active material layer in another unit used adjacent to the positive electrode active material layer with the separator interposed therebetween, the above-described area ratio of the entirety of the negative electrode active material layer to the area of the facing portion between the positive electrode active material layer and the negative electrode active material layer be achieved.

In the present invention, a gap between the positive electrode 1 and the negative electrode 2 is 0.1 mm to 0.5 mm in a winding axial direction S, and from the viewpoint of further improving the cycle characteristics, the gap is preferably 0.1 mm to 0.4 mm, more preferably 0.1 mm to 0.3 mm, further preferably 0.1 mm to 0.25 mm. Thus, the positive electrode and the negative electrode have a gap with a suitable size, so that a battery reaction is allowed to occur reversibly and continuously with sufficiently high efficiency even in an environment with a relatively high charge cutoff voltage, and as a result, the cycle characteristics are improved. If the gap is too small, Li is likely to precipitate from the edge portion of the negative electrode active material layer, and the amount of Li ions that move reversibly decreases, resulting in poor cycle characteristics. If the gap is too large, the potential of the edge portion of the positive electrode active material layer rises due to an influence of a non-facing portion of the negative electrode active material layer with the positive electrode active material layer, and the positive electrode active material deteriorates. Therefore, the battery reaction is less likely to occur reversibly, and the cycle characteristics deteriorate.

The gap between the positive electrode 1 and the negative electrode 2 is an amount of deviation between the positive electrode active material layer and the negative electrode active material layer facing each other in the wound electrode assembly. For example, the gap refers to a gap between the positive electrode active material layer and the negative electrode active material layer facing each other with the separator interposed therebetween when a winding-type electrode assembly is unwound. In view of the fact that the dimension of the negative electrode active material layer 20 (20a, 20b) is larger than the dimension of the positive electrode active material layer 10 (10a, 10b) as described above, in the inside of the secondary battery, an end of the negative electrode active material layer 20 protrudes from an end surface of the positive electrode active material layer 10 as is clear from FIG. 3.

Thus, for the positive electrode active material layer 10 and the negative electrode active material layer 20 facing each other with the separator interposed therebetween when the winding-type electrode assembly is unwound, protrusion lengths of protruding portions 23a to 23d of the negative electrode active material layer 20 from the end surface of the positive electrode active material layer 10 are referred to as "the gap between the positive electrode and the negative electrode." Of such "gap between the positive electrode and the negative electrode," the gap between the positive electrode and the negative electrode in the winding axial direction S may be within the above range.

Specifically, as shown in FIG. 3, the gap between the positive electrode and the negative electrode in the winding axial direction S is a distance D1 between any point d11 on a side perpendicular to the winding axial direction S among sides constituting an outer edge of the positive electrode active material layer 10 of the positive electrode and a point d12, which is a point on a side constituting an outer edge of the negative electrode active material layer 20 of the negative electrode and minimizes the distance from the point d11, in the plan view when the winding-type electrode assembly is unwound. In FIG. 3, only the protrusion length D1 of the protruding portion 23a of the negative electrode active material layer 20 is shown as the gap between the positive electrode and the negative electrode in the winding axial direction S. However, the gap includes the protrusion length of the protruding portion 23b of the negative electrode active material layer. The gap between the positive electrode and the negative electrode in the winding axial direction S is an average value of the protrusion lengths at any ten locations in the protruding portions 23a and 23b of the negative electrode active material layer. When the electrode assembly 100 has two or more sets of positive electrode active material layers and negative electrode active material layers facing each other, the gap between the positive electrode and the negative electrode in the winding axial direction S is the average value of the protrusion lengths at any ten locations in the protruding portions 23a and 23b of the negative electrode active material layer in all the sets.

In the present invention, from the viewpoint of further improving the cycle characteristics, the gap between the positive electrode and the negative electrode in the winding direction R is 8.0 mm or less, and, in particular, the gap is preferably 0.1 mm to 8.0 mm, more preferably 0.4 mm to 8.0 mm, further preferably 0.5 mm to 6 mm. The winding direction R corresponds to a direction perpendicular to the winding axial direction S in FIG. 3.

Specifically, as shown in FIG. 3, the gap between the positive electrode and the negative electrode in the winding direction R is a distance D2 between any point d21 on a side parallel to the winding axial direction S among the sides constituting the outer edge of the positive electrode active material layer 10 of the positive electrode and a point d22, which is a point on a side constituting the outer edge of the negative electrode active material layer 20 of the negative electrode and minimizes the distance to the point d21, in the plan view when the winding-type electrode assembly is unwound. In FIG. 3, only the protrusion length D2 of the protruding portion 23c of the negative electrode active material layer 20 is shown as the gap between the positive electrode and the negative electrode in the winding direction R. However, the gap includes the protrusion length of the protruding portion 23d of the negative electrode active material layer. The gap between the positive electrode and the negative electrode in the winding direction R is an average value of the protrusion lengths at any ten locations in the protruding portions 23c and 23d of the negative electrode active material layer. When the electrode assembly 100 has two or more sets of positive electrode active material layers and negative electrode active material layers facing each other, the gap between the positive electrode and the negative electrode in the winding direction R is the average value of the protrusion lengths at any ten locations in the protruding portions 23c and 23d of the negative electrode active material layer in all the sets. In the positive electrode 1, as shown in FIGS. 2A, 2B, and 2C, when the insulating tapes 30 are attached to the ends of the positive electrode active material layers 10a and 10b in the winding direction R, the outer edge of the positive electrode active material layer in the winding direction R corresponds to the boundaries L1a and L1b between the coated portion and the insulating tape 30 (see FIGS. 2A and 2B). Therefore, the gap between the positive electrode and the negative electrode in the winding direction R in this case refers to "D2" as shown in FIGS. 2A and 2B.

The gap between the positive electrode and the negative electrode in the winding axial direction S can be measured by unwinding the electrode assembly, or can be measured from a predetermined cross section of the secondary battery. When the gap is measured from the cross section of the secondary battery, the cross section can be obtained as an X-ray CT image, or the electrode assembly constituting the secondary battery can be obtained by fixing with a resin and polishing. When the gap is measured from the cross section of the secondary battery, the protruding portions 23a to 23b do not necessarily have a planar (flat plate) shape. When the protruding portions 23a to 23b do not have a flat (flat plate) shape and, for example, have a curved shape in a predetermined cross section, the protrusion length is a length when the protruding portion is a flat surface (flat plate). The gap between the positive electrode and the negative electrode can be measured by taking the cross section of the secondary battery as an X-ray CT image with ScanXmate (manufactured by Comscantecno Co., Ltd.).

The gap between the positive electrode and the negative electrode in the winding direction R can be measured by unwinding the electrode assembly, or can be measured from a predetermined cross section of the secondary battery. When the gap is measured from the cross section of the secondary battery, the electrode assembly constituting the secondary battery can be obtained by fixing with a resin and polishing. When the gap is measured from the cross section of the secondary battery, the protruding portions 23c to 23d do not necessarily have a planar (flat plate) shape. When the protruding portions 23c to 23d do not have a flat (flat plate) shape and, for example, have a curved shape in a predetermined cross section, the protrusion length is a length when the protruding portion is a flat surface (flat plate).

When the electrode assembly 100 is configured using two or more electrode units, in at least one of the units, the above-described "gap between the positive electrode and the negative electrode" may be achieved. From the viewpoint of further improving the cycle characteristics, it is preferable that the above-described "gap between the positive electrode and the negative electrode" be achieved in all the units. When the positive electrode has positive electrode active material layers on both sides of the positive electrode current collector and the negative electrode has negative electrode active material layers on both sides of the negative electrode current collector, from the same viewpoint, it is more preferable that in not only all the units but two adjacent units, the above-described "gap between the positive electrode and the negative electrode" be achieved. That is, it is more preferable that between the positive electrode in one unit and the negative electrode in another unit used adjacent to the positive electrode with the separator interposed therebetween, the above-described "gap between the positive electrode and the negative electrode" be achieved.

In the present invention, the discharge capacity (hereinafter sometimes referred to as discharge capacity A) per unit weight of the positive electrode active material contained in the positive electrode active material layer is 169.0 mAh/g to 178.0 mAh/g, and from the viewpoint of further improving the cycle characteristics, the discharge capacity A is preferably 169.0 mAh/g to 175.5 mAh/g, more preferably 169.0 mAh/g to 173 mAh/g. When the discharge capacity A is within the above range, a battery reaction is allowed to occur reversibly and continuously with sufficiently high efficiency even in an environment with a relatively high charge cutoff voltage, and as a result, the cycle characteristics are improved. When the discharge capacity A is too high, the potential of the positive electrode excessively increases, and the positive electrode active material deteriorates, so that the battery reaction is less likely to occur reversibly, and the cycle characteristics deteriorate.

The discharge capacity A is a value calculated by dividing an "initial cell capacity (mAh)" by the weight (g) of the positive electrode active material contained in the facing portion between the positive electrode (particularly the positive electrode active material layer) and the negative electrode (particularly the negative electrode active material layer) of the secondary battery.

The "initial cell capacity (mAh)" refers to a discharge capacity of a stabilized secondary battery and a discharge capacity measured by the following method. The secondary battery is repeatedly charged and discharged, and when a rate of change in capacity $[\{(P_n-P_{n+1})/P_{n+1}\}\times100(\%)]$ between a discharge capacity $P_n$(mAh) due to the nth charge/discharge cycle and a discharge capacity $P_{n-1}$(MAh) due to the (n+1)th charge/discharge cycle becomes 0.2% or less for the first time, the discharge capacity $P_{n+1}$(mAh) is the "initial cell capacity (mAh)." n is an integer of 1 or more.

When charging and discharging are repeated using the secondary battery, the rate of change in capacity $[\{(P_n-P_{n+1})/P_{n+1}\}\times100(\%)]$ between the discharge capacity $P_n$(mAh) due to the nth charge/discharge cycle and the discharge capacity $P_{n+1}$(mAh) due to the (n+1)th charge/discharge cycle generally decreases as the value of n increases. Therefore, for example, charging and discharging are repeated using a commercially available secondary battery, and when the rate of change in capacity "$\{(P_1-P_2)/P_2\}\times100(\%)]$" exceeds 0.2% and the rate of change in capacity "$\{(P_2-P_3)/P_3\}\times100(\%)]$" is 0.2% or less, the discharge capacity $P_3$ is the initial cell capacity of the secondary battery.

The weight (g) of the positive electrode active material contained in the facing portion between the positive electrode (particularly the positive electrode active material layer) and the negative electrode (particularly the negative electrode active material layer) of the secondary battery is a value that can be calculated from the area (cm$^2$) of the facing portion between the positive electrode (particularly the positive electrode active material layer) and the negative electrode (particularly the negative electrode active material layer), the basis weight (mg/cm$^2$) per unit area of the positive electrode active material layer, and a ratio of the positive electrode active material contained in the positive electrode active material layer.

The weight (g) of the positive electrode active material contained in the facing portion between the positive electrode (particularly the positive electrode active material layer) and the negative electrode (particularly the negative electrode active material layer) of the secondary battery refers to the total weight (g) of the positive electrode active material contained in the facing portion between the positive electrode (particularly the positive electrode active material layer) and the negative electrode (particularly the negative electrode active material layer) of each set when the secondary battery has two or more sets of the positive electrode active material layers and the negative electrode active material layers facing each other with the separator interposed therebetween.

The discharge capacity A can be controlled by adjusting the ratio of the basis weight of the positive electrode active material layer of the positive electrode to the basis weight of the negative electrode active material layer of the negative electrode, the charge cutoff voltage of the lithium ion secondary battery, the type of positive electrode active material, the type of negative electrode active material, and initial efficiency of the negative electrode active material.

For example, when the ratio of the basis weight of the positive electrode active material layer of the positive electrode to the basis weight of the negative electrode active material layer of the negative electrode is increased, the discharge capacity A increases. When the ratio is decreased, the discharge capacity A decreases. For example, when the charge cutoff voltage of the lithium ion secondary battery is increased, the discharge capacity A increases. When the charge cutoff voltage is lowered, the discharge capacity A decreases.

For example, since the reversible capacity of each active material varies depending on the kind of the positive electrode active material and the kind of the negative electrode active material, the discharge capacity A can be controlled.

For example, when a negative electrode active material with high initial efficiency is used, the discharge capacity A increases. When a negative electrode active material with low initial efficiency is used, the discharge capacity A decreases.

The basis weight of the negative electrode active material layer of the negative electrode refers to an amount deposited (after drying) per unit area of the negative electrode active material layer on one side of the negative electrode. The basis weight of the negative electrode active material layer of the negative electrode is usually 5 mg/cm$^2$ to 15 mg/cm$^2$, and from the viewpoint of controlling the discharge capacity of the positive electrode active material, the basis weight of the negative electrode active material layer is preferably 9 mg/cm$^2$ to 12 mg/cm$^2$, more preferably 9 mg/cm$^2$ to 11 mg/cm$^2$.

The basis weight of the positive electrode active material layer of the positive electrode refers to an amount deposited (after drying) per unit area of the positive electrode active material layer on one side of the positive electrode. The basis weight of the positive electrode active material layer of the positive electrode is usually 10 mg/cm$^2$ to 30 mg/cm$^2$, and from the viewpoint of controlling the discharge capacity of the positive electrode active material, the basis weight of the positive electrode active material layer is preferably 18 mg/cm$^2$ to 24 mg/cm$^2$.

(Positive Electrode)

The positive electrode 1 has at least the positive electrode active material layer 10. The positive electrode 1 is usually configured by the positive electrode active material layer 10 and the positive electrode current collector (foil) 11, and the positive electrode active material layer 10 is provided on at least one side of the positive electrode current collector 11. For example, in the positive electrode, the positive electrode active material layers may be provided on both sides of the positive electrode current collector, or the positive electrode active material layer may be provided on one side of the positive electrode current collector. A positive electrode which is preferable from the viewpoint of further increasing the capacity of the secondary battery has the positive electrode active material layers on both sides of the positive electrode current collector. When the electrode assembly 100 is configured using two or more electrode units, the secondary battery may include a plurality of positive electrodes, and may include one or more positive electrodes in which the positive electrode active material layers are provided on both sides of the positive electrode current collector and one or more positive electrodes in which the positive electrode active material layer is provided on one side of the positive electrode current collector. As shown in FIGS. 2A, 2B, and 2C, the positive electrode 1 preferably has a non-formation region (uncoated region) of the positive electrode active material layer on the outside of the positive electrode active material layers 10a and 10b in the winding direction R in the plan view on the both sides 11x and 11y of the positive electrode current collector 11. In the positive electrode 1, from the viewpoint of preventing deterioration of the positive electrode active material, as shown in FIGS. 2A, 2B and 2C, it is more preferable that the insulating tapes 30 be attached to the ends of the positive electrode active material layers 10a and 10b in the winding direction R (preferably the ends and a non-formation region adjacent to the ends) and unreacted (masked). The positive electrode 1 usually has "edge portions" at the ends of the positive electrode active material layers 10a and 10b in the axial direction S, as shown in FIGS. 2A, 2B and 2C. As described above, the "edge portion" refers to an electrode cut surface (current collector end surface (surface parallel to the thickness direction of the current collector)) at a portion of the electrode where the active material layer is coated.

The positive electrode active material layer contains a positive electrode active material, and usually further contains a binder and a conductive auxiliary agent. The positive electrode active material is usually made of a granular material, and a binder is contained in the positive electrode material layer in order to maintain a sufficient contact between particles and the shape of the particles. Further, a conductive auxiliary agent is preferably contained in the positive electrode active material layer in order to facilitate transmission of electrons promoting the battery reaction.

The positive electrode active material is a substance directly involved in the transfer of electrons in the secondary battery and is a main substance of the positive electrode which is responsible for charging and discharging, namely a battery reaction. More specifically, ions are generated in the electrolyte by "the positive electrode active material contained in the positive electrode material layer", and the ions move between the positive electrode and the negative electrode and the electrons are transferred, whereby charging and discharging are performed. The positive electrode active material layer is particularly preferably a layer capable of inserting and extracting lithium ions. Lithium ions move between the positive electrode and the negative electrode through an electrolyte, thereby charging and discharging the battery.

The positive electrode active material is not particularly limited as long as it is a material contributing to insertion and extraction of lithium ions. However, from the viewpoint of controlling the discharge capacity of the positive electrode active material and further improving the cycle characteristics, the positive electrode active material preferably contains a lithium-containing composite oxide. The lithium-containing composite oxide is usually a lithium transition metal composite oxide. The transition metal may be any transition metal (transition element), and examples thereof include a first transition element, a second transition element, and a third transition element. A preferred transition metal is the first transition element.

From the viewpoint of controlling the discharge capacity of the positive electrode active material and further improving the cycle characteristics, the positive electrode active material is preferably a lithium transition metal composite oxide containing lithium and at least one type of transition metal selected from the group consisting of scandium, titanium, vanadium, chromium, manganese, iron, cobalt, nickel, copper and zinc (particularly the group consisting of cobalt, nickel, manganese and iron). Specific examples of such a lithium transition metal composite oxide include lithium cobaltate, lithium nickelate, lithium manganate, lithium iron phosphate, and these transition metals having a part replaced with another metal (particularly those doped). Examples of another metal (doped metal) include one or more metals selected from the group consisting of aluminum, magnesium, zirconium, nickel, manganese, and titanium. From the viewpoint of controlling the discharge capacity of the positive electrode active material and further improving the cycle characteristics, the positive electrode active material preferably contains lithium cobalt oxide.

From the viewpoint of controlling the discharge capacity of the positive electrode active material and further improving the cycle characteristics, the positive electrode active material more preferably contains a lithium cobaltate compound as a main component. The positive electrode active material containing a lithium cobaltate compound as a main component means that the content of the lithium cobaltate compound relative to the positive electrode active material is 50% by weight or more. From the same viewpoint, the content of the lithium cobaltate compound is more preferably 80% by weight or more, most preferably 100% by weight relative to the positive electrode active material.

The lithium cobaltate compound includes pure lithium cobaltate represented by the chemical formula of $LiCoO_2$ and doped lithium cobaltate in which a part of cobalt is replaced (particularly doped) by another metal in the lithium cobaltate. From the viewpoint of controlling the discharge capacity of the positive electrode active material and further improving the cycle characteristics, doped lithium cobaltate is preferable. In the doped lithium cobaltate, the other metals (doped metals) include, for example, one or more metals selected from the group consisting of aluminum, magnesium, zirconium, nickel, manganese, and titanium, and from the same viewpoint, two or more metals selected from this group are preferably included. The other metals (doped metals) which are more preferable from the same viewpoint include one of aluminum and magnesium as the two or more metals. From the viewpoint of controlling the discharge capacity of the positive electrode active material and further improving the cycle characteristics, the substitution amount (doping amount) is usually 0.001 parts by weight to 5 parts by weight and preferably 0.1 parts by weight to 5 parts by weight with respect to 100 parts by weight of cobalt in the doped lithium cobaltate. From the viewpoint of controlling the discharge capacity of the positive electrode active material and further improving the cycle characteristics in an environment of a relatively higher charge cutoff voltage (for example, 4.45 V to 4.47 V), the substitution amount (doping amount) is preferably 0.8 parts by weight to 5 parts by weight, more preferably 1 part by weight to 5 parts by weight with respect to 100 parts by weight of cobalt in the doped lithium cobaltate. When the doped lithium cobaltate contains two or more metals as other metals (doped metals), the total substitution amount (total doping amount) may be within the above range.

In the present specification, as the amount of the positive electrode active material doped, a value measured by quantitative analysis by ICP analysis is used.

From the viewpoint of controlling the discharge capacity of the positive electrode active material and further improving the cycle characteristics, the average particle diameter D50 of the positive electrode active material is preferably 5 μm to 30 μm, more preferably 10 μm to 25 μm, further preferably 12 μm to 20 μm.

In the present specification, as the average particle diameter D50, a value measured by a laser diffraction particle size distribution analyzer (LA960 manufactured by Horiba, Ltd.) is used.

From the viewpoint of controlling the discharge capacity of the positive electrode active material and further improving the cycle characteristics, the positive electrode active material has a specific surface area of preferably 0.05 $m^2/g$ to 2 $m^2/g$, more preferably 0.1 $m^2/g$ to 1 $m^2/g$, further preferably 0.15 $m^2/g$ to 0.5 $m^2/g$.

In the present specification, as the specific surface area, a value measured by a specific surface area measuring apparatus (Macsorb manufactured by Mountech Co., Ltd.) is used.

A positive electrode active material can also be obtained as a commercial product, or can also be manufactured by a well-known method. For example, when the positive electrode active material is manufactured, a well-known method of manufacturing inorganic compounds can be used. Specifically, the positive electrode active material can be manufactured by weighing a plurality of compounds as raw materials so as to have a desired composition ratio, mixing them uniformly, and firing. Examples of the raw material compounds include lithium-containing compounds, transition element-containing compounds, typical element-containing compounds, and anion-containing compounds. As the lithium-containing compounds, for example, lithium hydroxide, chloride, nitrate and carbonate can be used. As the transition element-containing compounds, transition element oxides, hydroxides, chlorides, nitrates, carbonates, sulfates, and organic acid salts can be used. When a transition element is Co, Mn and Fe, specific examples of the transition element-containing compounds include manganese dioxide, γ-MnOOH, manganese carbonate, manganese nitrate, manganese hydroxide, $Co_3O_4$, CoO, cobalt hydroxide, $Fe_2O_3$ and $Fe_3O_4$. As the typical element-containing compounds, typical element oxides, hydroxides, chlorides, nitrates, carbonates, sulfates, and organic acid salts can be used. As the anion-containing compounds, when the anion is fluorine, lithium fluoride can be used, for example. The firing temperature is usually 400° C. or higher and 1200° C. or lower. Firing may be performed in air, vacuum, oxygen atmosphere, hydrogen atmosphere, or an inert gas atmosphere such as nitrogen and a rare gas.

The content of the positive electrode active material is usually 90% by weight to 99% by weight, preferably 95% by weight to 99% by weight, based on the total weight (solid content weight) of the positive electrode active material layer. The positive electrode active material layer may contain two or more types of positive electrode active materials, and in that case, the total content thereof may be within the above range.

The binder that can be contained in the positive electrode active material layer is not particularly limited. Examples of the binder of the positive electrode active material layer include at least one selected from the group consisting of polyvinylidene fluoride (PVdF), a vinylidene fluoride-hexafluoropropylene copolymer, a vinylidene fluoride-tetrafluoroethylene copolymer, polytetrafluoroethylene and the like. From the viewpoint of controlling the discharge capacity of the positive electrode active material and further improving the cycle characteristics, the binder of the positive electrode active material layer preferably contains polyvinylidene fluoride (PVdF).

The content of the binder of the positive electrode active material layer is usually 0.1% by weight to 5% by weight based on the total weight (solid content weight) of the positive electrode active material layer, and from the viewpoint of controlling the discharge capacity of the positive electrode active material and further improving the cycle characteristics, the content of the binder is preferably 0.5% by weight to 3% by weight, more preferably 0.5% by weight to 2% by weight. The positive electrode active material layer may contain two or more types of binders, and in that case, the total content thereof may be within the above range.

The conductive auxiliary agent that can be contained in the positive electrode active material layer is not particularly limited. Examples of the conductive auxiliary agent in the positive electrode active material layer include at least one selected from the group consisting of carbon black such as thermal black, furnace black, channel black, ketjen black, and acetylene black; graphite; carbon fibers such as carbon nanotube and vapor-grown carbon fiber; metal powders such as copper, nickel, aluminum, and silver; polyphenylene derivatives, and the like. From the viewpoint of controlling the discharge capacity of the positive electrode active material and further improving the cycle characteristics, the conductive auxiliary agent of the positive electrode active material layer preferably contains carbon fibers (particularly carbon nanotubes).

The average diameter of carbon fibers (particularly carbon nanotubes) is usually 1 nm to 20 nm, preferably 2 nm to 12 nm. The average chain length of carbon fibers (particularly carbon nanotubes) is usually 0.05 μm to 500 μm, preferably 0.1 μm to 300 μm. The average diameter and average chain length are average values of any 100 carbon fibers.

The content of the conductive auxiliary agent of the positive electrode active material layer is usually 0.1% by weight to 5% by weight based on the total weight (solid content weight) of the positive electrode active material layer, and from the viewpoint of controlling the discharge capacity of the positive electrode active material and further improving the cycle characteristics, the content of the conductive auxiliary agent is preferably 0.5% by weight to 2% by weight. The positive electrode active material layer may contain two or more types of conductive auxiliary agents, and in that case, the total content thereof may be within the above range.

The positive electrode active material layer can be obtained by, for example, applying and drying a positive electrode slurry, obtained by dispersing a positive electrode active material, a binder to be added if desired, and a conductive auxiliary agent in a solvent, to a positive electrode current collector, and compacting (rolling) the resulting product with a roll press or the like. Density can be controlled by adjusting pressure during the compacting operation. The solvent of the positive electrode slurry is not particularly limited, and usually a solvent capable of dissolving the binder is used. Examples of the solvent of the positive electrode slurry include organic solvents such as N-methylpyrrolidone, toluene, tetrahydrofuran, cyclohexane, and methyl ethyl ketone, and water. A coating amount of the positive electrode slurry on one surface may be in such a range that the basis weight of the positive electrode active material layer described above is achieved after drying. From the viewpoint of controlling the discharge capacity of the positive electrode active material and further improving the cycle characteristics, in a preferred embodiment, the positive electrode active material and the binder in the positive electrode active material layer correspond to a combination of a lithium cobaltate compound (particularly doped lithium cobaltate) and polyvinylidene fluoride.

The positive electrode current collector used for the positive electrode is a member contributing to the collection and supply of electrons generated in the positive electrode active material by the battery reaction. Such a positive electrode current collector may be a sheet-like metal member and may be in a porous or perforated form. For example, each of the positive electrode current collectors may be a metal foil, a punching metal, a net, an expanded metal, or the like. The positive electrode current collector used for the positive electrode is preferably made of a metal foil containing at least one selected from the group consisting of aluminum, stainless steel, nickel and the like, and may be, for example, an aluminum foil.

The positive electrode active material layer usually has a density of 3.5 g/cm$^3$ to 4.5 g/cm$^3$, and from the viewpoint of controlling the discharge capacity of the positive electrode active material and further improving the cycle characteristics, the density is preferably 3.6 g/cm$^3$ to 4.4 g/cm$^3$, more preferably 3.7 g/cm$^3$ to 4.3 g/cm$^3$, further preferably 3.8 g/cm$^3$ to 4.2 g/cm$^3$.

In the present specification, the density of the positive electrode active material layer is a value calculated by dividing the mass of the layer by the volume of the layer. The mass of the positive electrode active material layer can be determined by weighing the positive electrode active material layer peeled from the positive electrode current collector. The volume of the positive electrode active material layer can be obtained from a product of the thickness of the positive electrode active material layer and the formation area of the positive electrode active material layer obtained after subtracting the thickness of the positive electrode current collector from the thickness of the positive electrode to calculate the thickness of the positive electrode active material layer.

(Negative Electrode)

The negative electrode 2 has at least the negative electrode active material layer 20. The negative electrode 2 is usually configured by the negative electrode active material layer 20 and the negative electrode current collector (foil) 21, and the negative electrode active material layer 20 is provided on at least one side of the negative electrode current collector 21. For example, in the negative electrode, the negative electrode active material layers may be provided on both sides of the negative electrode current collector, or the negative electrode active material layer may be provided on one side of the negative electrode current collector. A negative electrode which is preferable from the viewpoint of further increasing the capacity of the secondary battery has the negative electrode active material layers on both sides of the negative electrode current collector. When the electrode assembly 100 is configured using two or more electrode units, the secondary battery may include a plurality of negative electrodes, and one or more negative electrodes in which the negative electrode active material layers are provided on both sides of the negative electrode current collector and one or more negative electrodes in which the negative electrode active material layer is provided on one side of the negative electrode current collector. As shown in FIGS. 2A, 2B, and 2C, the negative electrode 2 preferably has a non-formation region (uncoated region) of the negative electrode active material layer on the outside of the negative electrode active material layers 20a and 20b in the winding direction R in the plan view on the both sides 21x and 21y of the negative electrode current collector 21. Also in the negative electrode 2, as in the positive electrode 1, insulating tapes may be attached to the ends of the negative electrode active material layers 20a and 20b in the winding direction R (preferably the ends and a non-formation region adjacent to the ends) and unreacted (masked). The negative electrode 2 usually has "edge portions" at the ends of the negative electrode active material layers 20a and 20b in the axial direction S, as shown in FIGS. 2A, 2B and 2C.

The negative electrode active material layer contains a negative electrode active material, and usually further contains a binder and a conductive auxiliary agent, like the positive electrode active material layer. The negative electrode active material is usually made of a granular material, and a binder is contained in the negative electrode material layer in order to maintain a sufficient contact between particles and the shape of the particles. Further, a conductive auxiliary agent is preferably contained in the negative electrode active material layer in order to facilitate transmission of electrons promoting the battery reaction.

The negative electrode active material contained in the negative electrode material layer is, like the positive electrode active material contained in the positive electrode active material layer, a substance directly involved in the transfer of electrons in the secondary battery and is a main substance of the negative electrode which is responsible for charging and discharging, namely a battery reaction. More specifically, ions are generated in the electrolyte by "the negative electrode active material contained in the negative electrode material layer", and the ions move between the positive electrode and the negative electrode and the electrons are transferred, whereby charging and discharging are performed. The negative electrode material layer is particularly preferably a layer capable of inserting and extracting lithium ions.

The negative electrode active material is not particularly limited as long as it is a substance contributing to insertion and extraction of lithium ions, and, for example, various carbon materials, oxides, lithium alloys, silicon, silicon alloys, and tin alloys are preferable. From the viewpoint of controlling the discharge capacity of the positive electrode active material and further improving the cycle characteristics, the negative electrode active material is preferably a carbon material.

Examples of various carbon materials of the negative electrode active material include graphite (for example, natural graphite, artificial graphite, MCMB (mesocarbon microbeads), non-graphitizable carbon, and easy-graphitizable carbon), hard carbon, soft carbon, and diamond-like carbon. In particular, graphite is preferable because it has high electron conductivity and excellent adhesive properties to a negative electrode current collector. Examples of the oxide of the negative electrode active material include at least one selected from the group consisting of silicon oxide [SiOx(0.5≤x≤1.5)], tin oxide, indium oxide, zinc oxide, lithium oxide and the like. The lithium alloy of the negative electrode active material may be any metal as long as the metal can be alloyed with lithium, and the lithium alloy may be, for example a binary, ternary or higher alloy of a metal such as Al, Si, Pb, Sn, In, Bi, Ag, Ba, Ca, Hg, Pd, Pt, Te, Zn or La and lithium. It is preferable that such an oxide and lithium alloy be amorphous as their structural forms. This is because degradation due to nonuniformity such as crystal grain boundaries or defects is hardly caused. From the viewpoint of controlling the discharge capacity of the positive electrode active material and further improving the cycle characteristics, the negative electrode active material preferably contains carbon materials and more preferably contains graphite (particularly artificial graphite).

The reversible capacity of the negative electrode active material is usually 300 mAh/g to 1000 mAh/g, and from the viewpoint of controlling the discharge capacity of the positive electrode active material and further improving the cycle characteristics, the reversible capacity is preferably 330 mAh/g to 370 mAh/g.

The reversible capacity of the negative electrode active material is an intrinsic property value of the negative electrode active material, and the discharge capacity (mAh/g) when charge and discharge are performed under mild conditions using the negative electrode and lithium metal as a counter electrode.

From the viewpoint of controlling the discharge capacity of the positive electrode active material and further improving the cycle characteristics, the negative electrode active material more preferably contains graphite (particularly artificial graphite) as a main component. The negative electrode active material containing graphite (particularly artificial graphite) as a main component means that the content of graphite (particularly artificial graphite) relative to the negative electrode active material is 50% by weight or more. From the same viewpoint, the content of graphite (particularly artificial graphite) is more preferably 80% by weight or more, most preferably 100% by weight relative to the negative electrode active material.

The average particle diameter D50 of the negative electrode active material is usually 5 μm to 30 μm, and from the viewpoint of controlling the discharge capacity of the positive electrode active material and further improving the cycle characteristics, the average particle diameter D50 is preferably 10 μm to 25 μm, more preferably 12 μm to 20 μm.

The negative electrode active material usually has a specific surface area of 0.5 m$^2$/g to 10 m$^2$/g, and from the viewpoint of controlling the discharge capacity of the positive electrode active material and further improving the cycle characteristics, the specific surface area is preferably 1 m$^2$/g to 5 m$^2$/g, more preferably 1.5 m$^2$/g to 3 m$^2$/g.

The content of the negative electrode active material is usually 90% by weight to 99% by weight, preferably 95% by weight to 99% by weight, based on the total weight (solid content weight) of the negative electrode active material layer. The negative electrode active material layer may contain two or more types of negative electrode active materials, and in that case, the total content thereof may be within the above range.

The binder that can be contained in the negative electrode active material layer is not particularly limited. Examples of the binder of the negative electrode active material layer include at least one kind selected from the group consisting of styrene-butadiene rubber (SBR), polyacrylic acid, polyvinylidene fluoride (PVdF), polyimide-based resin, and polyamideimide-based resin. From the viewpoint of controlling the discharge capacity of the positive electrode active material and further improving the cycle characteristics, the binder of the negative electrode active material layer preferably contains styrene butadiene rubber.

The content of the binder of the negative electrode active material layer is usually 0.1% by weight to 5% by weight based on the total weight (solid content weight) of the negative electrode active material layer, and from the viewpoint of controlling the discharge capacity of the positive electrode active material and further improving the cycle characteristics, the content of the binder is preferably 0.5% by weight to 3% by weight, more preferably 1% by weight to 3% by weight. The negative electrode active material layer may contain two or more types of binders, and in that case, the total content thereof may be within the above range.

The conductive auxiliary agent that can be contained in the negative electrode active material layer is not particularly limited. Examples of the conductive auxiliary agent in the negative electrode active material layer include at least one selected from the group consisting of carbon black such as thermal black, furnace black, channel black, ketjen black, and acetylene black, carbon fibers such as carbon nanotube and vapor-grown carbon fiber, metal powders such as copper, nickel, aluminum, and silver, polyphenylene derivatives, and the like.

The content of the conductive auxiliary agent of the negative electrode active material layer is usually 0% by weight to 5% by weight, preferably 0.5% by weight to 2% by weight, based on the total weight (solid content weight) of the negative electrode active material layer. The negative electrode active material layer may contain two or more types of conductive auxiliary agents, and in that case, the total content thereof may be within the above range. When graphite is used as a negative electrode active material, a conductive auxiliary agent is not usually used.

The negative electrode active material layer may contain a thickener. Examples of the thickener include carboxymethyl cellulose (CMC) and polyacrylic acid.

The content of the thickener of the negative electrode active material layer is usually 0.1% by weight to 5% by weight, preferably 0.5% by weight to 2% by weight, based on the total weight (solid content weight) of the negative electrode active material layer. The negative electrode active material layer may contain two or more types of thickeners, and in that case, the total content thereof may be within the above range.

The negative electrode active material layer can be obtained by, for example, applying and drying a negative electrode slurry, obtained by dispersing a negative electrode active material, a binder to be added if desired, a conductive auxiliary agent and a thickener in a solvent, to a negative electrode current collector, and compacting (rolling) the resulting product with a roll press or the like. The solvent of the negative electrode slurry is not particularly limited, and the same solvent illustrated as the solvent of the positive electrode slurry is mentioned. A coating amount of the negative electrode slurry on one surface may be in such a range that the basis weight of the negative electrode active material layer described above is achieved after drying. From the viewpoint of controlling the discharge capacity of the positive electrode active material and further improving the cycle characteristics, in a preferred embodiment, the negative electrode active material and the binder in the negative electrode active material layer correspond to a combination of graphite (particularly artificial graphite) and styrene butadiene rubber.

The negative electrode current collector used for the negative electrode is a member contributing to the collection and supply of electrons generated in the positive electrode active material by the battery reaction. Such a current collector may be a sheet-like metal member and may be in a porous or perforated form. For example, like the positive electrode current collector, each of the negative electrode current collectors may be a metal foil, a punching metal, a net, an expanded metal, or the like. The negative electrode current collector used for the negative electrode is preferably made of a metal foil containing at least one selected from the group consisting of copper, stainless steel, nickel and the like, and may be, for example, a copper foil.

The negative electrode active material layer usually has a density of $1.0$ $g/cm^3$ to $1.9$ $g/cm^3$, and from the viewpoint of controlling the discharge capacity of the positive electrode active material and further improving the cycle characteristics, the density is preferably $1.2$ $g/cm^3$ to $1.85$ $g/cm^3$, more preferably $1.5$ $g/cm^3$ to $1.8$ $g/cm^3$.

In the present specification, the density of the negative electrode active material layer is a value calculated by dividing the mass of the layer by the volume of the layer. The mass of the negative electrode active material layer can be determined by weighing the negative electrode active material layer peeled from the negative electrode current collector. The volume of the negative electrode active material layer can be obtained from a product of the thickness of the negative electrode active material layer and the formation area of the negative electrode active material layer obtained after subtracting the thickness of the negative electrode current collector from the thickness of the negative electrode to calculate the thickness of the negative electrode active material layer.

(Separator)

The separator is not particularly limited as long as it can pass ions while preventing electrical contact between the positive electrode and the negative electrode. The material that forms the separator is not particularly limited as long as the electrical contact between the positive electrode and the negative electrode can be prevented, and examples thereof include an electrically insulating polymer. Examples of the electrically insulating polymer include polyolefin (for example, polyethylene and polypropylene), polyester, polyimide, polyamide, polyamideimide, aramid, and cellulose. Preferably, the separator is a porous or microporous insulating member and has a film form due to its small thickness. Although it is merely an example, a microporous membrane made of polyolefin may be used as the separator. The surface of the separator may be covered with an inorganic particle coating layer, and/or an adhesive layer. The surface of the separator may have adhesive properties.

The separator and the positive electrode and/or the negative electrode may be bonded. Adhesion can be achieved by using an adhesive separator as the separator, by applying an adhesive binder onto the electrode active material layer (the positive electrode active material layer and/or the negative electrode active material layer), and/or by thermocompression bonding. An adhesive can be used to impart adhesive properties or adhesive strength to the separator or electrode active material layer. As the adhesive, polyvinylidene fluoride, an acrylic adhesive, or the like can be used. Moreover, filler particles such as alumina and silica may be used with the adhesive.

The thickness of the separator is not particularly limited, and may be, for example, 1 μm to 100 μm, particularly 5 μm to 20 μm. The thickness of the separator is the thickness inside the secondary battery.

(Nonaqueous Electrolyte)

The nonaqueous electrolyte assists movement of lithium ions released from the electrodes (positive electrode/negative electrode). The nonaqueous electrolyte includes a nonaqueous solvent and an electrolyte salt. The nonaqueous electrolyte may have a form such as liquid or gel (note that the term "liquid" nonaqueous electrolyte is also referred to herein as "nonaqueous electrolyte liquid").

The nonaqueous solvent of the nonaqueous electrolyte is not particularly limited, and examples thereof include at least one selected from the group consisting of carbonate-based solvents, ester-based solvents, sultone-based solvents, nitrile-based solvents, and fluorides thereof. From the viewpoint of controlling the discharge capacity of the positive electrode active material and further improving the cycle characteristics, the nonaqueous electrolyte preferably contains a carbonate solvent as a nonaqueous solvent.

The carbonate-based solvent contains cyclic carbonates and/or chain carbonates, and from the viewpoint of controlling the discharge capacity of the positive electrode active material and further improving the cycle characteristics, the carbonate-based solvent preferably contains cyclic carbonates and chain carbonates. Examples of the cyclic carbonates include at least one kind selected from the group consisting of propylene carbonate (PC), ethylene carbonate (EC), fluoroethylene carbonate (FEC), butylene carbonate (BC), and vinylene carbonate (VC). Examples of the chain carbonates include at least one kind selected from the group consisting of dimethyl carbonate (DMC), diethyl carbonate (DEC), ethyl methyl carbonate (EMC), and dipropyl carbonate (DPC). The content of the carbonate-based solvent is usually 20% by volume or more with respect to the nonaqueous solvent of the nonaqueous electrolyte, and from the viewpoint of controlling the discharge capacity of the positive electrode active material and further improving the cycle characteristics, the content of the carbonate-based solvent is preferably 25% by volume or more, more preferably 30% by volume or more.

Examples of the ester-based solvent include at least one selected from the group consisting of methyl formate, ethyl formate, propyl formate, methyl acetate, ethyl acetate, propyl acetate, methyl propionate, ethyl propionate, propyl propionate (PP), and methyl butyrate.

Examples of the sultone-based solvent include at least one selected from the group consisting of propane sultone (PS) and propene sultone.

Examples of the nitrile-based solvent include at least one selected from the group consisting of adiponitrile (ADN), succinonitrile, suberonitrile, acetonitrile, glutaronitrile, methoxyacetonitrile, and 3-methoxypropionitrile.

From the viewpoint of controlling the discharge capacity of the positive electrode active material and further improving the cycle characteristics, the nonaqueous solvent preferably contains cyclic carbonates and a chain solvent. The chain solvent includes the above-described chain carbonates and ester-based solvents. A volume ratio of the cyclic carbonates to the chain solvent (cyclic carbonates/chain solvent) is usually 20/80 to 80/20, and from the viewpoint of controlling the discharge capacity of the positive electrode active material and further improving the cycle characteristics, the volume ratio is preferably 25/75 to 75/25, more preferably 30/70 to 70/30.

As the electrolyte salt of the nonaqueous electrolyte, for example, Li salts such as $LiPF_6$, $LiBF_4$, $LiCl_4$, $LiCF_3SO_3$, Li $(CF_3SO_2)_2N$, Li $(C_2F_5SO_2)_2N$, Li $(CF_3)_2N$, and $LiB(CN)_4$ are preferably used. An electrolyte salt which is preferable from the viewpoint of controlling the discharge capacity of the positive electrode active material and further improving the cycle characteristics is $LiPF_6$.

The concentration of the electrolyte salt in the nonaqueous electrolyte is not particularly limited, and may be, for example, 0.1 mol/L to 4 mol/L, and from the viewpoint of controlling the discharge capacity of the positive electrode active material and further improving the cycle characteristic, the concentration of the electrolyte salt is preferably 0.5 mol/L to 2 mol/L.

[Manufacture of Secondary Battery]

The secondary battery can be manufactured by encapsulating an electrode assembly including a positive electrode, a negative electrode, and a separator and a nonaqueous electrolyte in an enclosure, and then performing initial charging. An aging process may be further performed after the initial charging process.

The enclosure may be a flexible pouch (soft bag) or a hard case (hard housing).

When the enclosure is a flexible pouch, the flexible pouch is usually formed from a laminate film, and sealing and encapsulation are achieved by heat-sealing a peripheral edge. As the laminate film, a film obtained by stacking a metal foil and a polymer film is generally used, and specific examples thereof include one having a three-layer structure including an outer layer polymer film, a metal foil, and an inner layer polymer film. The outer layer polymer film is for preventing permeation of moisture and the like and damage to the metal foil due to contact and the like, and polymers such as polyamide and polyester can be suitably used. The metal foil is for preventing permeation of moisture and gas, and foils of copper, aluminum, stainless steel, and the like can be suitably used. The inner layer polymer film serves to protect the metal foil from the electrolyte housed inside while also providing a melt seal during heat sealing. For example, a polyolefin or acid-modified polyolefin can be suitably used. The thickness of the laminate film is not particularly limited, and is preferably 1 μm to 1 mm, for example.

When the enclosure is a hard case, the hard case is usually formed from a metal plate, and sealing and encapsulation are achieved by irradiating an peripheral edge with laser. As the metal plate, a metal material made of aluminum, nickel, iron, copper, stainless steel or the like is common. The thickness of the metal plate is not particularly limited, and is preferably 1 μm to 1 mm, for example.

The secondary battery usually has two external terminals 15 and 25. The two external terminals 15 and 25 are connected to an electrode (positive electrode or negative electrode) through or without a current collecting lead, and as a result, are led out from the enclosure.

The initial charging process is a first charging process performed for the purpose of forming a solid electrolyte interface coating (hereinafter referred to as "SEI film") on the negative electrode surface, and is also referred to as a conditioning process or a formation process. The SEI film is formed by reducing and decomposing an additive, contained in the electrolyte in the present step, on the negative electrode surface, and prevents further decomposition of the additive on the negative electrode surface during use as a secondary battery. The SEI film typically includes one or more materials selected from the group consisting of LiF, $Li_2CO_3$, LiOH, and LiOCOOR (R represents a monovalent organic group such as an alkyl group). When such a SEI film is more uniformly formed on the negative electrode surface, decomposition of an electrolyte component can be prevented in the secondary battery, the capacity of the secondary battery can be stabilized, and the life can be extended.

In the initial charging process, charging may be performed at least once. Usually, charge and discharge are performed once or more. One charge/discharge cycle includes one charge and one subsequent discharge. If charge and discharge are performed twice or more, the charge-discharge is repeated the number of times. The number of charge/discharge cycles performed in the present step is usually 1 to 3.

A charging method may be a constant current charging method, a constant voltage charging method, or a combination thereof. For example, constant voltage charging and constant voltage charging may be repeated during one charge. Charging conditions are not particularly limited as long as the SEI film is formed. From the viewpoint of further improving uniformity of the thickness of the SEI film, it is preferable to perform constant voltage charging after performing constant current charging. When constant voltage charging is performed after constant current charging is performed, it is preferable to employ the following charging conditions from the viewpoint of further improving the uniformity of the SEI film thickness.

Constant Current Charging Method:

Constant current charging is performed at a constant current value of 0.01 C to 3 C, especially 0.05 C to 2 C until a voltage value reaches 1 V to 6 V, especially 3 V to 5 V. Here, 1 C refers to a current value when a rated capacity of the secondary battery is discharged in one hour.

Constant Voltage Charging Method:

Constant voltage charging is performed with a voltage value achieved by constant current charging until the value reaches a predetermined value smaller than a constant current value at the time of constant current charging or until a predetermined time elapses.

A discharging method may be usually a constant current discharging method, a constant voltage discharging method, or a combination thereof. Discharging conditions are not particularly limited as long as the SEI film is formed. From the viewpoint of further improving the uniformity of the thickness of the SEI film, it is preferable to perform constant current discharging. When constant current discharging is performed, it is preferable to employ the following discharging conditions from the viewpoint of further improving the uniformity of the SEI film thickness.

Constant Current Discharging Method:

Constant current discharging is performed at a constant current value of 0.1 C to 3 C, especially 0.2 C to 2 C until a voltage value reaches 1 V to 4 V, especially 2 V to 3.5 V.

In the initial charging process, the secondary battery is usually maintained at a temperature in a range of 25° C. or higher and 100° C. or lower, preferably in a range of 35° C. or higher and 90° C. or lower, more preferably 40° C. or higher and 85 C° or lower.

The aging process is a process of stabilizing the SEI film by leaving the secondary battery after the initial charging process in an open circuit state. The aging process is also called a maturation process.

In the aging process, the temperature of the secondary battery is not particularly limited, and may be maintained within a range of 15° C. or higher and 80° C. or lower, for example. The secondary battery is preferably maintained at a temperature in a range of 20° C. or higher and 75° C. or lower, more preferably 25° C. or higher and 70° C. or lower from the viewpoint of further stabilizing the SEI film. Specifically, the temperature can be maintained within the above range by leaving the secondary battery in a space set at a constant temperature.

The leaving time in the aging process is not particularly limited as long as stabilization of the SEI film is promoted, and is usually 10 minutes to 30 days, and from the viewpoint of further stabilizing the SEI film, the leaving time is preferably in a range of 30 minutes to 14 days, more preferably in a range of 1 hour to 7 days.

EXAMPLES

Example/Comparative Example (Fabrication of Positive Electrode)

The positive electrode 1 shown in FIGS. 2A to 2C was fabricated. Specifically, lithium cobaltate (LCO1) shown in Table 1 was used as the positive electrode active material. 97.5% by weight of LCO1, 1.0% by weight of carbon nanotubes having an average diameter of 5 nm and an average chain length of 200 μm and serving as a conductive auxiliary agent, and 1.5% by weight of polyvinylidene fluoride as a binder were used. These were mixed with NMP to obtain a positive electrode mixture slurry. Next, the positive electrode mixture slurry was uniformly applied to an aluminum foil having a thickness of 10 μm and rolled with a roll press to obtain the double-sided positive electrode 1 having the positive electrode active material layers 10$a$ and 10$b$ on both sides as shown in FIGS. 2A to 2C. The basis weight (per side) of the positive electrode active material layer of the positive electrode was 19.0 mg/cm$^2$, and the density was 4.10 g/cm$^3$. The basis weight and density of the positive electrode active material layer were common in each Example and Comparative Example.

TABLE 1

| Positive electrode active material | Doping element, Doping amount | D50 (μm) | SSA (m2/g) |
| --- | --- | --- | --- |
| LCO1 | Mg: 1 part by weight Zr: 0.05 parts by weight | 17 | 0.2 |

(Fabrication of Negative Electrode)

The negative electrode 2 shown in FIGS. 2A to 2C was fabricated. Specifically, artificial graphite (AG1) shown in Table 2 was used as the negative electrode active material. 97.0% by weight of AG1, 2.0% by weight of styrene butadiene rubber as a binder, and 1.0% by weight of carboxymethylcellulose as a thickener were used. These were mixed with water to obtain a negative electrode mixture slurry. Next, the negative electrode mixture slurry was uniformly applied to a copper foil having a thickness of 6 μm and rolled with a roll press to obtain the double-sided negative electrode 2 having the negative electrode active material layers 20$a$ and 20$b$ on both sides as shown in FIGS. 2A to 2C. The basis weight (per side) of the negative electrode active material layer of the negative electrode was 10.0 mg/cm$^2$, and the density was 1.70 g/cm$^3$. The basis weight and density of the negative electrode active material layer were common in each Example and Comparative Example.

TABLE 2

| Negative electrode active material | Type of graphite | D50 (μm) | SSA (m2/g) | Reversible capacity (mAh/g) | Initial efficiency (%) |
| --- | --- | --- | --- | --- | --- |
| AG1 | Artificial graphite | 14 | 2.0 | 350 | 92.0 |

(Production of Electrolyte Solution)

LiPF$_6$ was dissolved in 98 parts by volume of a solution in which the volume ratio of ethylene carbonate to diethyl carbonate was 3:7 so that the concentration in an electrolyte solution was 1 mol/L, and 2 parts by volume of vinylene carbonate was mixed to obtain the electrolyte solution.

(Manufacture of Battery)

First, the winding-type electrode assembly shown in FIG. 1 was manufactured. Specifically, one double-sided positive electrode 1 and one double-sided negative electrode 2 fabricated according to the above method were superimposed with a separator (not shown) interposed therebetween as shown in FIG. 2C, and, in addition, the separator (not shown) was superimposed on the double-sided positive electrode 1 and wound in the winding direction R to manufacture the winding-type electrode assembly shown in FIG. 1.

Next, the winding-type electrode assembly and the electrolytic solution were encapsulated in a laminate enclosure to manufacture a winding-type lithium ion secondary battery. Each of the positive electrode 1 and the negative electrode 2 was provided with the external terminals 15 and 25 in the vicinity of a winding center portion, and the external terminals were led out to the outside from the enclosure, and used for charging and discharging. The "sizes of the positive electrode and the negative electrode" were sizes per one side of the positive electrode active material layer and the negative electrode active material layer, and were as shown in Tables 3 and 4. For each electrode active material layer, the size of the electrode active material layer was the same on one side and the other side of the current collector (foil). The "gap between the positive electrode and the negative electrode" was a gap between the positive electrode active material layer and the negative electrode active material layer, and was as shown in Tables 3 and 4. In the "gap between the positive electrode and the negative electrode", the average value of the protrusion lengths D1 at any ten locations in all the protruding portions 23a and 23b in the winding axial direction S was shown as the "length" of the gap. The average value of the protrusion lengths D2 at any ten locations in all the protruding portions 23c and 23d in the winding direction R was shown as the "width" of the gap. The total area ratio of the entirety of the negative electrode active material layer in the negative electrode to the total area of the facing portions between all sets of the positive electrode active material layers and the negative electrode active material layers facing each other was calculated as "area ratio (%)." As a separator, a separator (11 μm thick) having an adhesive layer formed from polyvinylidene fluoride and alumina particles on both sides of a polyethylene microporous membrane was used.

The initial charging process and the aging process were performed.

In the initial charging process, constant current charging was performed until the voltage reached 4.0 V at 0.5 C in an environment of 60° C., and then constant voltage charging was performed for 30 minutes at the voltage value.

In the aging process, aging treatment was performed at 60° C. for 24 hours.

(Stabilization of Battery)

Using the above secondary battery, charging and discharging were repeated in a constant temperature bath at 25° C. to stabilize the battery.

Specifically, charging and discharging were repeated until the rate of change in capacity [{($P_n$−$P_{n+1}$)/$P_{n+1}$}100(%)] between the discharge capacity $P_n$(mAh) due to the nth charge/discharge cycle and the discharge capacity $P_{n+1}$ (MAh) due to the (n+1)th charge/discharge cycle became 0.2% or less for the first time. Here, n is an integer of 2 or more. More specifically, among the repeated charging and discharging operations, in the charging, constant current charging was performed at a current value of 0.5 C up to the charge cutoff voltage shown in Tables 3 to 4, and then constant voltage charging was performed for 1 hour at the charge cutoff voltage. In the discharging, after a 10 minute break from the completion of the charging, constant current discharging was performed at a current value of 0.2 C up to a voltage of 3.0 V. The capacity at the time of the constant current discharging was measured as the discharge capacity. After the discharging, a 10 minute break was given.

(Initial Cell Capacity)

The battery was stabilized as described above, and when the rate of change in capacity [{($P_n$−$P_{n+1}$)/$P_{n+1}$}100(%)] between the discharge capacity $P_n$(mAh) due to the nth charge/discharge cycle and the discharge capacity $P_{n+1}$ (MAh) due to the (n+1)th charge/discharge cycle became 0.2% or less for the first time, the discharge capacity $P_{n-1}$(MAh) due to the (n+1)th charge/discharge cycle was defined as the initial cell capacity.

(Discharge Capacity (mAh/g) Per Unit Weight of Positive Electrode Active Material)

The "discharge capacity (mAh/g) per unit weight of the positive electrode active material" was calculated from the "initial cell capacity" and the weight (g) of the positive electrode active material contained in the facing portion between the positive electrode (particularly the positive electrode active material layer) and the negative electrode (particularly the negative electrode active material layer) of the secondary battery. A weight W1 (g) of the positive electrode active material contained in the facing portion between the positive electrode (particularly the positive electrode active material layer) and the negative electrode (particularly the negative electrode active material layer) of the secondary battery was calculated from the following formula:

W1 (g)=the area (cm$^2$) of the facing portion between the positive electrode (particularly the positive electrode active material layer) and the negative electrode (particularly the negative electrode active material layer)×the basis weight (mg/cm$^2$) per unit area of the positive electrode active material layer×the ratio of the positive electrode material contained in the positive electrode active material layer (Initial Efficiency and Reversible Capacity of Negative Electrode Active Material)

The initial efficiency and reversible capacity of the negative electrode active material are values measured by the following method. The charge/discharge cycle was performed in a range of 0.01 V to 1.5 V in a counter electrode lithium coin cell using a single-sided negative electrode, and the ratio (%) of the discharge capacity of the first cycle to the charge capacity of the first cycle was defined as the initial efficiency. The discharge capacity (mAh/g) at the third cycle was defined as the reversible capacity. The charge/discharge conditions in the charge/discharge cycle were as follows.

Charge: 0.4 mA, 0.01 V, 25° C., constant current/constant voltage charging (constant voltage charging: 5 hours);

Discharge: 0.4 mA, 1.5 V, 25° C., constant current discharging.

(Cycle Test)

Using the above secondary battery, a cycle test was performed in a constant temperature bath at 25° C. In the charging, constant current charging was performed at a current value of 1.0 C up to the charge cutoff voltage shown in Tables 3 to 4, and then constant voltage charging was performed for 1 hour at the charge cutoff voltage. After a 10 minute break from the completion of the charging, constant current discharging was performed at a current value of 1.0 C up to a voltage of 3.0 V, and discharging was performed, followed by a 10 minute break. This charge/discharge cycle was repeated 400 times. Thereafter, the (401th) charge/discharge cycle was performed under the following conditions, and the discharge capacity at the time of constant current discharging was defined as "cell capacity after the cycle."

Charge: After constant current charging was performed at a current value of 0.5 C up to the charge cutoff voltage shown in Tables 3 to 4, constant voltage charging was performed for 1 hour at the charge cutoff voltage; and Discharge: After a 10 minute break from the completion of the charging, constant current discharging was performed at a current value of 0.2 C up to a voltage of 3.0 V.

A ratio of the "cell capacity after the cycle" to the "initial cell capacity" was defined as a "capacity retention rate (%) after the cycle."

The "capacity retention rate (%) after the cycle" was evaluated according to the following criteria:
⊚: 87% or more (best):
○: 83% or more (good):
Δ: 80% or more (no problem in practical use (within tolerance)):
x: Less than 80% (there is a problem in practical use).

Table 3 shows the results of changing the size of the positive electrode and the negative electrode, the gap between the positive electrode and the negative electrode, and the area ratio of the negative electrode to the positive electrode under the condition that the charge cutoff voltage is 4.41 V. Table 4 shows the results of changing the size of the positive electrode and the negative electrode, the gap, and the charge cutoff voltage in a cell in which the area ratio was fixed.

TABLE 3

| | Dimension of positive electrode active material layer Length × width | Size of negative electrode active material layer Length × width | Gap between positive electrode and negative electrode (mm) | | Area ratio | Charge cutoff voltage | Discharge capacity per unit weight of positive electrode active material | Rate of change in capacity $(P_n - P_{n+1})/P_{n+1} \times 100$ | Initial cell capacity $P_{n+1}$ | Capacity retention rate after cycle |
|---|---|---|---|---|---|---|---|---|---|---|
| | (mm × mm) | (mm × mm) | Length | Width | (%) | (V) | (mAh/g) | (%) | (mAh) | (%) |
| Comparative Example A1 | 50.0 × 500 | 50.0 × 510 | 0.0 | 5.0 | 102.0% | 4.41 | 171.2 | 0.13 (n = 4) | 1557 | 76.1%X |
| Example A1 | 50.0 × 500 | 50.2 × 510 | 0.1 | 5.0 | 102.4% | 4.41 | 171.8 | 0.13 (n = 4) | 1588 | 88.5%⊚ |
| Example A2 | 50.0 × 500 | 50.4 × 510 | 0.2 | 5.0 | 102.8% | 4.41 | 172.6 | 0.13 (n = 4) | 1595 | 87.7%⊚ |
| Example A3 | 50.0 × 500 | 50.6 × 510 | 0.3 | 5.0 | 103.2% | 4.41 | 173.5 | 0.13 (n = 4) | 1603 | 86.5%○ |
| Example A4 | 50.0 × 500 | 50.8 × 510 | 0.4 | 5.0 | 103.6% | 4.41 | 174.5 | 0.13 (n = 4) | 1613 | 84.9%○ |
| Example A5 | 50.0 × 500 | 51.0 × 510 | 0.5 | 5.0 | 104.0% | 4.41 | 175.7 | 0.13 (n = 4) | 1624 | 82.8%Δ |
| Comparative Example A2 | 50.0 × 500 | 51.2 × 510 | 0.6 | 5.0 | 104.4% | 4.41 | 177.7 | 0.13 (n = 4) | 1642 | 78.5%X |
| Example B1 | 50.0 × 500 | 50.2 × 501 | 0.1 | 0.5 | 100.6% | 4.41 | 169.3 | 0.13 (n = 4) | 1564 | 90.3%⊚ |
| Example B2 | 50.0 × 500 | 50.2 × 502 | 0.1 | 1.0 | 100.8% | 4.41 | 169.6 | 0.13 (n = 4) | 1567 | 90.2%⊚ |
| Example B3 | 50.0 × 500 | 50.2 × 504 | 0.1 | 2.0 | 101.2% | 4.41 | 170.1 | 0.13 (n = 4) | 1572 | 89.9%⊚ |
| Example B4 | 50.0 × 500 | 50.2 × 516 | 0.1 | 8.0 | 103.6% | 4.41 | 173.7 | 0.13 (n = 4) | 1605 | 86.2%○ |
| Comparative Example B1 | 50.0 × 500 | 50.2 × 528 | 0.1 | 14.0 | 106.0% | 4.41 | 177.9 | 0.13 (n = 4) | 1644 | 78.0%X |
| Example C1 | 30.0 × 700 | 30.2 × 710 | 0.1 | 5.0 | 102.1% | 4.41 | 171.4 | 0.13 (n = 4) | 1330 | 88.9%⊚ |
| Example C2 | 30.0 × 700 | 30.6 × 710 | 0.3 | 5.0 | 103.5% | 4.41 | 173.9 | 0.13 (n = 4) | 1349 | 85.9%○ |
| Comparative Example C1 | 30.0 × 700 | 31.0 × 710 | 0.5 | 5.0 | 104.8% | 4.41 | 177.1 | 0.13 (n = 4) | 1375 | 79.9%X |
| Example D1 | 60.0 × 500 | 60.4 × 510 | 0.2 | 5.0 | 102.7% | 4.41 | 172.4 | 0.13 (n = 4) | 1911 | 87.9%⊚ |
| Example D2 | 60.0 × 500 | 60.8 × 510 | 0.4 | 5.0 | 103.4% | 4.41 | 174.1 | 0.13 (n = 4) | 1930 | 85.6%○ |
| Comparative Example D1 | 60.0 × 500 | 61.2 × 510 | 0.6 | 5.0 | 104.0% | 4.41 | 177.3 | 0.13 (n = 4) | 1966 | 79.4%X |

$P_{n+1}$ represents the discharge capacity due to the (n + 1)th charge/discharge cycle and the discharge capacity when the rate of change in capacity from the discharge capacity $P_n$ (mAh) due to the previous charge/discharge cycle has become 0.2% or less for the first time.

TABLE 4

| | Size of positive electrode active material layer Length × width | Size of negative electrode active material layer Length × width | Gap between positive electrode and negative electrode (mm) | | Area ratio | Charge cutoff voltage | Discharge capacity per unit weight of positive electrode active material | Rate of change in capacity $(P_n - P_{n+1})/P_{n+1} \times 100$ | Initial cell capacity $P_{n+1}$ | Capacity retention rate after cycle |
|---|---|---|---|---|---|---|---|---|---|---|
| | (mm × mm) | (mm × mm) | Length | Width | (%) | (V) | (mAh/g) | (%) | (mAh) | (%) |
| Example E1 | 90.0 × 1000 | 90.6 × 1004 | 0.3 | 2.0 | 101.1% | 4.41 | 169.0 | 0.13 (n = 4) | 5622 | 90.5%⊚ |
| Example E2 | 90.0 × 1000 | 90.6 × 1004 | 0.3 | 2.0 | 101.1% | 4.43 | 171.3 | 0.14 (n = 4) | 5698 | 89.0%⊚ |
| Example E3 | 90.0 × 1000 | 90.6 × 1004 | 0.3 | 2.0 | 101.1% | 4.45 | 174.6 | 0.14 (n = 4) | 5807 | 84.8%○ |
| Example E4 | 90.0 × 1000 | 90.6 × 1004 | 0.3 | 2.0 | 101.1% | 4.47 | 175.9 | 0.15 (n = 4) | 5852 | 80.2%Δ |
| Example F1 | 90.0 × 500 | 90.6 × 504 | 0.3 | 2.0 | 101.5% | 4.41 | 170.9 | 0.13 (n = 4) | 2841 | 89.4%⊚ |
| Example F2 | 90.0 × 500 | 90.6 × 504 | 0.3 | 2.0 | 101.5% | 4.43 | 173.4 | 0.14 (n = 4) | 2883 | 86.7%○ |
| Example F3 | 90.0 × 500 | 90.6 × 504 | 0.3 | 2.0 | 101.5% | 4.45 | 177.0 | 0.14 (n = 4) | 2943 | 80.2%Δ |
| Comparative Example F1 | 90.0 × 500 | 90.6 × 504 | 0.3 | 2.0 | 101.5% | 4.47 | 178.4 | 0.15 (n = 4) | 2968 | 74.5%X |
| Example G1 | 90.0 × 200 | 90.6 × 204 | 0.3 | 2.0 | 102.7% | 4.41 | 172.6 | 0.13 (n = 4) | 1148 | 87.6%⊚ |
| Example G2 | 90.0 × 200 | 90.6 × 204 | 0.3 | 2.0 | 102.7% | 4.43 | 175.4 | 0.14 (n = 4) | 1167 | 83.4%○ |

TABLE 4-continued

| | Size of positive electrode active material layer Length × width (mm × mm) | Size of negative electrode active material layer Length × width (mm × mm) | Gap between positive electrode and negative electrode (mm) | | Area ratio (%) | Charge cutoff voltage (V) | Discharge capacity per unit weight of positive electrode active material (mAh/g) | Rate of change in capacity $(P_n - P_{n+1})/P_{n+1} \times 100$ (%) | Initial cell capacity $P_{n+1}$ (mAh) | Capacity retention rate after cycle (%) |
|---|---|---|---|---|---|---|---|---|---|---|
| | | | Length | Width | | | | | | |
| Comparative Example G1 | 90.0 × 200 | 90.6 × 204 | 0.3 | 2.0 | 102.7% | 4.45 | 179.3 | 0.14 (n = 4) | 1192 | 74.5%X |
| Comparative Example G2 | 90.0 × 200 | 90.6 × 204 | 0.3 | 2.0 | 102.7% | 4.47 | 180.8 | 0.15 (n = 4) | 1203 | 67.8% X |

$P_{n+1}$ represents the discharge capacity due to the (n + 1)th charge/discharge cycle and the discharge capacity when the rate of change in capacity from the discharge capacity $P_n$ (mAh) due to the previous charge/discharge cycle has become 0.2% or less for the first time.

In the lithium ion secondary battery in which the area ratio of the entirety of the negative electrode active material layer to the area of the facing portion between the positive electrode active material layer and the negative electrode active material layer was 100.5% to 104.0%, the gap between the positive electrode and the negative electrode was 0.1 mm to 0.5 mm, and the discharge capacity per unit weight of the positive electrode active material contained in the positive electrode active material layer was 169.0 mAh/g to 178.0 mAh/g, the "capacity retention rate after the cycle" reached as high as 80% or more, and good cycle characteristics were obtained in all lithium ion secondary batteries having a charge cutoff voltage of 4.41 V to 4.47 V.

Among the above-described secondary batteries having good cycle characteristics, in particular, in the secondary battery having the discharge capacity of 169.0 mAh/g to 175.5 mAh/g, the "capacity retention rate after the cycle" reached as high as 83% or more, and better cycle characteristics were obtained.

Among the above-described secondary batteries having good cycle characteristics, in particular, in the secondary battery having the discharge capacity of 169.0 mAh/g to 173 mAh/g, the "capacity retention rate after the cycle" reached as higher as 87% or more, and further better cycle characteristics were obtained.

<Measurement Method>

(Doping Element and Doping Amount of Positive Electrode Active Material)

The doping element of the positive electrode active material and the amount of the positive electrode active material doped were measured by quantitative analysis by ICP analysis. The content of the doping element was determined when the amount of Co contained in the positive electrode active material was 100 parts by weight.

(Average particle diameter D50)

The average particle diameter D50 was measured by a laser diffraction particle size distribution analyzer (LA960 manufactured by Horiba, Ltd.). In the present specification, the volume-based cumulative 50% diameter (D50) measured by this analyzer is expressed as an average particle diameter.

(Specific Surface Area (SSA))

The specific surface area (SSA) was measured by a specific surface area measuring apparatus (Macsorb manufactured by Mountech Co., Ltd.). In the present specification, the specific surface area ($m^2/g$) measured by this measuring apparatus is expressed as SSA.

(Density)

The density of the positive electrode active material layer was calculated by the following method. The thickness of the positive electrode active material layer is calculated by subtracting the thickness of the positive electrode current collector from the thickness of the positive electrode, the volume of the positive electrode active material layer is calculated from the product of the thickness of the positive electrode active material layer and the formation area of the positive electrode active material layer, and the weight of the positive electrode active material layer is divided by the volume to calculate the density.

The density of the negative electrode active material layer was calculated according to the above-described method for calculating the density of the positive electrode active material layer.

The secondary battery of the present invention can be used in various fields in which electricity storage is assumed. Although the followings are merely examples, the secondary battery of the present invention can be used in electricity, information and communication fields where mobile devices and the like are used (e.g., mobile device fields, such as mobile phones, smart phones, smart watches, laptop computers, digital cameras, activity meters, arm computers, and electronic papers), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), IoT fields, and space and deep sea applications (e.g., the fields such as spacecraft and research submarines).

The invention claimed is:

1. A winding-type lithium ion secondary battery comprising:
   a winding-type electrode assembly in which a positive electrode having a positive electrode active material layer, a negative electrode having a negative electrode active material layer, and a separator interposed between the positive electrode and the negative electrode are wound into a roll shape and has:
   a charge cutoff voltage of 4.41 V to 4.47 V,
   an area ratio of an entirety of the negative electrode active material layer to an area of a facing portion between the positive electrode active material layer and the negative electrode active material layer of 100.5% to 104.0%,
   a gap between the positive electrode and the negative electrode of 0.1 mm to 0.5 mm in an axial direction of the winding, and
   a discharge capacity per unit weight of a positive electrode active material in the positive electrode active material layer of 169.0 mAh/g to 178.0 mAh/g.

2. The winding-type lithium ion secondary battery according to claim 1, wherein the area ratio is 100.5% to 103.6%.

3. The winding-type lithium ion secondary battery according to claim 1, wherein the area ratio is 100.5% to 103.0%.

4. The winding-type lithium ion secondary battery according to claim 1, wherein the area ratio is 100.5% to 101.0%.

5. The winding-type lithium ion secondary battery according to claim 1, wherein a gap between the positive electrode and the negative electrode in a winding direction of the winding-type electrode assembly is 8.0 mm or less.

6. The winding-type lithium ion secondary battery according to claim 1, wherein the discharge capacity is 169.0 mAh/g to 175.5 mAh/g.

7. The winding-type lithium ion secondary battery according to claim 1, wherein the discharge capacity is 169.0 mAh/g to 173 mAh/g.

8. The winding-type lithium ion secondary battery according to claim 1, wherein the positive electrode active material contains a lithium transition metal composite oxide.

9. The winding-type lithium ion secondary battery according to claim 1, wherein the positive electrode active material contains a lithium cobaltate compound as a main component thereof.

10. The winding-type lithium ion secondary battery according to claim 1, wherein a negative electrode active material in the negative electrode active material layer contains a carbon material.

11. The winding-type lithium ion secondary battery according to claim 1, wherein the negative electrode active material in the negative electrode active material layer contains graphite as a main component thereof.

12. The winding-type lithium ion secondary battery according to claim 1, wherein the positive electrode active material layer has a basis weight of 10 mg/cm$^2$ to 30 mg/cm$^2$.

13. The winding-type lithium ion secondary battery according to claim 1, wherein the positive electrode active material layer has a density of 3.5 g/cm$^3$ to 4.5 g/cm$^3$.

14. The winding-type lithium ion secondary battery according to claim 1, wherein the negative electrode active material layer has a basis weight of 5 mg/cm$^2$ to 15 mg/cm$^2$.

15. The winding-type lithium ion secondary battery according to claim 12, wherein the negative electrode active material layer has a basis weight of 5 mg/cm$^2$ to 15 mg/cm$^2$.

16. The winding-type lithium ion secondary battery according to claim 1, wherein the negative electrode active material layer has a density of 1.0 g/cm$^3$ to 1.9 g/cm$^3$.

17. The winding-type lithium ion secondary battery according to claim 13, wherein the negative electrode active material layer has a density of 1.0 g/cm$^3$ to 1.9 g/cm$^3$.

18. The winding-type lithium ion secondary battery according to claim 1, further comprising a liquid, nonaqueous electrolyte.

19. The winding-type lithium ion secondary battery according to claim 18, wherein the nonaqueous electrolyte contains a carbonate-based solvent.

20. A mobile device comprising the winding-type lithium ion secondary battery according to claim 1.

\* \* \* \* \*